(12) United States Patent
Gawryla et al.

(10) Patent No.: US 12,188,603 B2
(45) Date of Patent: Jan. 7, 2025

(54) PIPE INSULATION AND METHOD OF AND SYSTEM FOR MAKING SAME

(71) Applicant: Owens Corning Intellectual Capital, LLC, Toledo, OH (US)

(72) Inventors: Matthew D. Gawryla, Newark, OH (US); Christopher J. Clements, Johnstown, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 17/880,731

(22) Filed: Aug. 4, 2022

(65) Prior Publication Data

US 2023/0017766 A1 Jan. 19, 2023

Related U.S. Application Data

(63) Continuation of application No. 16/234,817, filed on Dec. 28, 2018, now Pat. No. 11,428,361.
(Continued)

(51) Int. Cl.
| | |
|---|---|
| *F16L 59/14* | (2006.01) |
| *B32B 1/08* | (2006.01) |
| *B32B 3/26* | (2006.01) |
| *B32B 5/02* | (2006.01) |
| *B32B 5/14* | (2006.01) |
| *F16L 59/02* | (2006.01) |
| *F16L 59/10* | (2006.01) |

(52) U.S. Cl.
CPC ............... *F16L 59/14* (2013.01); *B32B 1/08* (2013.01); *B32B 3/263* (2013.01); *B32B 5/02* (2013.01); *B32B 5/14* (2013.01); *B32B 5/142* (2013.01); *F16L 59/02* (2013.01); *F16L 59/027* (2013.01); *F16L 59/029* (2013.01); *F16L 59/143* (2013.01); *B32B 2262/0284* (2013.01); *B32B 2262/101* (2013.01); *F16L 59/10* (2013.01); *Y10T 428/13* (2015.01)

(58) Field of Classification Search
CPC ......... F16L 59/14; F16L 59/02; F16L 59/029; B32B 1/08; B32B 3/263; B32B 5/02; B32B 5/14; B32B 2262/101; Y10T 428/13
See application file for complete search history.

(56) References Cited

U.S. PATENT DOCUMENTS

| | | | |
|---|---|---|---|
| 2,500,282 A | 3/1950 | Francis, Jr. | |
| 2,778,759 A * | 1/1957 | Stephens | B29C 67/248 |
| | | | 138/147 |

(Continued)

FOREIGN PATENT DOCUMENTS

| | | |
|---|---|---|
| CN | 103807523 A | 5/2014 |
| EP | 2232124 A1 | 9/2010 |

(Continued)

OTHER PUBLICATIONS

English machine translation for EP0176721 (1986). (Year: 1986).*

(Continued)

*Primary Examiner* — Michael C Miggins
(74) *Attorney, Agent, or Firm* — Calfee, Halter & Griswold LLP

(57) ABSTRACT

Methods of and systems for forming pipe insulation are disclosed. The pipe insulation has properties that are non-homogenous through its thickness.

22 Claims, 16 Drawing Sheets

Related U.S. Application Data

(60) Provisional application No. 62/611,578, filed on Dec. 29, 2017.

(56) References Cited

U.S. PATENT DOCUMENTS

| | | | |
|---|---|---|---|
| 2,946,371 | A | 7/1960 | Stephens et al. |
| 3,012,923 | A | 12/1961 | Games |
| 3,347,725 | A | 10/1967 | Stephens et al. |
| 3,498,862 | A | 3/1970 | Comastri et al. |
| 3,635,256 | A | 1/1972 | McLarty |
| 3,642,034 | A | 2/1972 | Ullman et al. |
| 4,094,715 | A | 6/1978 | Henderson et al. |
| 4,239,064 | A | 12/1980 | Gilman |
| 4,546,210 | A | 10/1985 | Akiba et al. |
| 4,590,108 | A | 5/1986 | Nippe |
| 4,874,648 | A | 10/1989 | Hill et al. |
| 5,532,458 | A | 7/1996 | Kratel et al. |
| 5,607,529 | A | 3/1997 | Adamczyk et al. |
| 6,183,016 | B1 | 2/2001 | Parker |
| 6,306,235 | B1 | 10/2001 | Henderson |
| 6,527,015 | B2 | 3/2003 | Lively |
| 6,547,908 | B2 | 4/2003 | Keyes et al. |
| 6,615,878 | B2 | 9/2003 | Dewimille et al. |
| 7,410,550 | B2 | 8/2008 | Sherwin |
| 7,891,381 | B2 | 2/2011 | Anders et al. |
| 8,104,311 | B2 | 1/2012 | Baker et al. |
| 2002/0066491 | A1* | 6/2002 | Lively ............ F16L 59/143 138/146 |
| 2005/0016665 | A1 | 1/2005 | Hudson |
| 2008/0138553 | A1 | 6/2008 | Lauer et al. |
| 2010/0012004 | A1 | 1/2010 | Telander |
| 2010/0154917 | A1 | 6/2010 | Batallas et al. |
| 2010/0221376 | A1 | 9/2010 | Lee |
| 2015/0219269 | A1 | 8/2015 | Fleischer et al. |
| 2015/0247270 | A1 | 9/2015 | Thaxton et al. |
| 2018/0320824 | A1 | 11/2018 | Fay et al. |

FOREIGN PATENT DOCUMENTS

| | | | | |
|---|---|---|---|---|
| GB | 2055442 | * | 3/1981 | ............ F16L 9/14 |
| JP | S46-690 | | 9/1971 | |
| JP | S48-26559 | U | 3/1973 | |
| JP | H04-306199 | | 10/1992 | |
| JP | H05-71641 | U | 9/1993 | |
| JP | 2014169786 | A | 9/2014 | |
| JP | 2016070493 | A | 5/2016 | |
| KR | 101180775 | B1 | 9/2012 | |
| KR | 101740379 | B1 | 5/2017 | |
| RU | 2248378 | C2 | 3/2005 | |
| WO | 9221908 | A1 | 12/1992 | |
| WO | 2002042679 | A1 | 5/2002 | |
| WO | 2011022668 | A1 | 2/2011 | |

OTHER PUBLICATIONS

English machine translation for CN104110558 (2014). (Year: 2014).*
Office Action from CN Application No. 201880087716.6 dated Oct. 9, 2022.
International Search Report and Written Opinion from PCT/US18/67797 dated Apr. 30, 2019.
Office Action from CN Application No. 201880087716.6 dated Jan. 5, 2022.
Extended European Search Report from EP Application No. 18894185.0 dated Jun. 11, 2021.
Office Action from EP Application No. 18894185.0 dated Apr. 22, 2022.
Office Action from IN Application No. 202037027460 dated Jun. 3, 2022.
Office Action from RU Application No. 2020120907 dated Jan. 24, 2021.
Office Action from U.S. Appl. No. 16/234,817 dated Jan. 25, 2021.
Office Action from U.S. Appl. No. 16/234,817 dated Jan. 6, 2022.
Notice of Allowance from U.S. Appl. No. 16/234,817 dated Apr. 19, 2022.
Office Action from MX Application No. MX/a/2020/006861 dated Jul. 5, 2022.
Office Action from EP Application No. 18894185.0 dated Nov. 14, 2022.
Office Action from RU Application No. 2020120907 dated Dec. 16, 2022.
Office Action from EP Application No. 18894185.0 dated Jul. 4, 2023.
Office Action from JP Application No. 2020-536035 dated Aug. 3, 2022.
Office Action from KR Application No. 10-2020-7021285 dated Apr. 26, 2023.
Office Action from EP Application No. 18894185.0 dated Jan. 17, 2024.
Office Action from JP Application No. 2023-006675 dated Feb. 21, 2024.
Office Action from EP Application No. 18894185.0 dated Jul. 2, 2024.
Office Action from EP Application No. 18894185.0 dated Jul. 29, 2024.

* cited by examiner

PIPE INSULATION AND METHOD OF AND SYSTEM FOR MAKING SAME

CROSS-REFERENCE TO RELATED APPLICATIONS

This application is a continuation of U.S. application Ser. No. 16/234,817, filed Dec. 28, 2018, which claims priority to and any benefit of U.S. Provisional Application No. 62/611,578, filed Dec. 29, 2017, the entire contents of which are incorporated herein by reference.

FIELD

The general inventive concepts relate to fibrous pipe insulation and, more particularly, to a method of and a system for forming pipe insulation having non-homogeneous properties.

BACKGROUND

As shown in FIG. 1, pipe insulation 100 is normally formed from a single insulating material 102 (e.g., fiberglass) as an elongated hollow cylinder having a wall thickness 104 and an inner cavity 106. The inner cavity 106 defines an inner diameter 108 of the pipe insulation 100. The inner diameter 108 of the pipe insulation 100 is selected to match an outer diameter of a pipe or pipe-like member to be insulated. An optional outer jacket 110 is wrapped around the insulating material 102 and acts as, amongst other things, a vapor barrier for the pipe insulation 100. The outer jacket 110 can also act as an aesthetic covering for the insulating material 102. A slit 112 is formed through the insulating material 102 and the outer jacket 110 to facilitate placement of the pipe insulation 100 around the pipe. To further facilitate installation of the pipe insulation 100, a partial slit 114 can also be formed, usually on an opposite side of the insulating material 102 from the slit 112. The partial slit 114 typically does not extend through the entire thickness 104 of the insulating material 102 (and does not breach the outer jacket 110). After the pipe insulation 100 is fitted around the pipe, a portion of the outer jacket 110 forms a cover 116 that extends over (and seals) the slit 112.

The pipe insulation 100 is typically made according to either a mandrel winding (MW) process or a continuous molded pipe (CMP) process.

In a mandrel winding (MW) process, a fiberglass "pelt" is continuously fed to and wrapped around a mandrel to build up a desired thickness of pipe insulation. The pipe insulation, along with the mandrel, is then moved to an oven where it is cured to form the pipe insulation. In the meantime, another distinct mandrel is used so that the MW process can continue in a pseudo-continuous fashion.

In a continuous molded pipe (CMP) process, a continuous flow of uncured fiberglass "pelt" is transferred on conveyors. The uncured pelt has a width that approximately corresponds to a circumference of the pipe insulation being made. The pelt is then transferred to a scrim which pulls it around a mandrel which is in-line with the pelt and then continues into the mold. The mold has an outer circumference that corresponds to the outer circumference of the pipe insulation and the mandrel size corresponds to the inner circumference of the pipe insulation. Hot air is blown through the insulation while it is in the mold to cure the binder. A continuous piece of cured pipe insulation comes out of the rear of the mold. The continuous piece of cured pipe insulation is then slit along its length (which, as noted above, allows an end user to fit the pipe insulation over a pipe), followed by cutting the pipe insulation into 3-foot long sections to form the finished pipe insulation. The fully formed pipe insulation pieces are then transferred by conveyer to a second machine that applies the jacket material to create the finished product. In the CMP process, the rate of production is determined by the ability to cure the binder in the mold (thicker insulations run slower).

In both the MW and CMP processes, the pelt is made up of glass fibers which have been collected on a belt that has uncured binder on it. The glass fibers are often produced onsite by a rotary fiber spinning process. The pelt will typically have a thickness greater than 1 inch and an area weight greater than 0.04 lb/ft$^2$.

There is an unmet need for a process for forming pipe insulation, wherein the properties of the pipe insulation can be adjusted or otherwise varied through the thickness of the pipe insulation. The proposed process is preferably a continuous or pseudo-continuous process. Furthermore, because the proposed process can use preformed fiberglass mats as its input, it avoids various problems associated with conventional production methods, such as the need for having a glass manufacturing device (e.g., a melter) on site. By removing the need for a co-located melter, the proposed process reduces the need to source and store raw materials for making the fiberglass, reduces emissions that would be generated by the melter, and facilitates start-stop operations of the process by decoupling the process from the melter which generally runs non-stop (i.e., 24/7) for efficiency.

SUMMARY

It is proposed herein to provide a more efficient and/or versatile process for forming pipe insulation.

Accordingly, the general inventive concepts relate to and contemplate a method of and system for producing pipe insulation, wherein the properties of the pipe insulation can be adjusted or otherwise varied through the thickness of the pipe insulation.

In some exemplary embodiments, the general inventive concepts relate to a method of and a system for forming pipe insulation from preformed fibrous insulation material (e.g., mats, felts, webs, wovens, non-wovens). In this manner, co-location of the pipe manufacturing process with the input fiber production is unnecessary, which provides many advantages.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed fibrous insulation material. Any suitable insulative fibers may be used in the preformed fibrous insulation material, such as glass fibers, mineral wool fibers, polymer fibers, ceramic fibers, metallic fibers, etc. In some exemplary embodiments, the energy is applied to the layers while the insulation material is on the mandrel.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed fiberglass mat. In some exemplary embodiments, the energy is applied to the layers while the insulation material is on the mandrel.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed felt mat. In some exemplary embodiments, the energy is applied to the layers while the insulation material is on the mandrel.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed composite fiber mat. In some exemplary embodiments, the energy is applied to the layers while the insulation material is on the mandrel.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed woven fabric. In some exemplary embodiments, the energy is applied to the layers while the insulation material is on the mandrel.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed non-woven fabric. In some exemplary embodiments, the energy is applied to the layers while the insulation material is on the mandrel.

According to an exemplary embodiment, a method of forming pipe insulation is provided. The method comprises providing a supply of insulation material; spiral winding a plurality of layers of the insulation material around a mandrel until a desired thickness is achieved; and applying energy to the layers of the insulation material to fix the layers of the insulation material to one another, wherein the insulation material is a preformed mineral wool web. In some exemplary embodiments, the energy is applied to the layers while the insulation material is on the mandrel.

In some exemplary embodiments, the method further comprises applying a binder to the layers of the insulation material prior to spiral winding of the layers.

In some exemplary embodiments, the method further comprises activating a binder in the layers of the insulation material prior to spiral winding of the layers.

In some exemplary embodiments, the desired thickness of the insulation material is within the range of 0.25 inches to 6 inches.

In some exemplary embodiments, the energy is thermal energy. In some exemplary embodiments, the thermal energy is applied to the layers of the insulation material within a temperature range of 75° F. to 700° F. for a duration of 2 seconds to 10 minutes.

In some exemplary embodiments, no binder is applied to the layers of the insulation material prior to spiral winding of the layers. Instead, mechanical energy (e.g., needling) is used to form the insulation material prior to spiral winding of the layers.

In some exemplary embodiments, the energy is applied to the layers of the insulation material while the layers of the insulation material are being spiral wound on the mandrel.

The method further comprises removing the insulation material spiral wound on the mandrel from the mandrel. In some exemplary embodiments, the thermal energy is applied to the layers of the insulation material after the insulation material is removed from the mandrel.

In some exemplary embodiments, the method further comprises cutting the pipe insulation to a desired length. In some exemplary embodiments, the length is within the range of 0.5 feet to 12 feet.

In some exemplary embodiments, the supply of insulation material includes a plurality of rolls of the preformed fibrous insulation material (e.g., a fiberglass mat), wherein each of the rolls corresponds to one of the layers of the insulation material being spiral wound on the mandrel.

In some exemplary embodiments, the method further comprises treating at least one of the layers of the insulation material to alter a property of the layer prior to the layer being spiral wound on the mandrel. In some exemplary embodiments, the property is a color of the treated layer. In some exemplary embodiments, the property is an approach angle of the treated layer relative to the mandrel.

In some exemplary embodiments, the preformed fibrous insulation material is a fiberglass mat having a thickness of less than 0.5 inches. In some exemplary embodiments, the fiberglass mat has a thickness of less than 0.25 inches. In some exemplary embodiments, the fiberglass mat has an area weight of less than 0.08 lb/ft$^2$. In some exemplary embodiments, the fiberglass mat has an area weight of less than 0.04 lb/ft$^2$.

In some exemplary embodiments, the method further comprises cutting a slit through the pipe insulation along an entire length of the pipe insulation.

In some exemplary embodiments, the method further comprises applying an outer jacket to the pipe insulation. In some exemplary embodiments, the method further comprises printing information relating to the pipe insulation on the outer jacket.

In some exemplary embodiments, at least one property of the insulation material varies through the thickness of the pipe insulation.

According to an exemplary embodiment, a system for forming pipe insulation is provided. The system comprises a roll feeder for feeding a plurality of rolls of a preformed fibrous insulation material; a winder for spiral winding a plurality of layers of the insulation material around a mandrel, each of the layers corresponding to one of the rolls of the insulation material; and a heater for applying thermal energy to the layers of the insulation material to fix the layers of the insulation material to one another. Any suitable insulative fibers may be used in the preformed fibrous insulation material, such as glass fibers, mineral wool fibers, polymer fibers, ceramic fibers, metallic fibers, etc. In some exemplary embodiments, the thermal energy is applied to the layers while the fibrous insulation material is on the mandrel.

In some exemplary embodiments, the preformed fibrous insulation material is a fiberglass mat.

In some exemplary embodiments, the preformed fibrous insulation material is a felt mat.

In some exemplary embodiments, the preformed fibrous insulation material is a composite fiber mat.

In some exemplary embodiments, the preformed fibrous insulation material is a woven fabric.

In some exemplary embodiments, the preformed fibrous insulation material is a non-woven fabric.

In some exemplary embodiments, the preformed fibrous insulation material is a mineral wool web.

In some exemplary embodiments, the system further comprises a layer treatment station, wherein the layer treatment station applies a binder to the layers of the insulation material prior to spiral winding of the layers.

In some exemplary embodiments, the system further comprises a layer treatment station, wherein the layer treatment station activates a binder in the layers of the insulation material prior to spiral winding of the layers.

In some exemplary embodiments, the system further comprises a layer treatment station, wherein the layer treatment station varies an approach angle (winding angle) of one or more of the layers relative to the mandrel.

In some exemplary embodiments, the system further comprises a layer treatment station, wherein the layer treatment station treats at least one of the layers of the insulation material to alter a property of the layer prior to the layer being spiral wound on the mandrel. In some exemplary embodiments, the property is a color of the treated layer.

In some exemplary embodiments, the layers of the insulation material are spiral wound to a thickness within the range of 0.25 inches to 6 inches.

In some exemplary embodiments, the heater is an oven through which the pipe insulation passes.

In some exemplary embodiments, the thermal energy is applied to the layers of the insulation material within a temperature range of 75° F. to 700° F. for a duration of 2 seconds to 10 minutes.

In some exemplary embodiments, the heater applies the thermal energy to the layers of the insulation material while the layers of the insulation material are being spiral wound on the mandrel.

In some exemplary embodiments, the heater applies the thermal energy to the layers of the insulation material after the layers of the insulation material are removed from the mandrel.

In some exemplary embodiments, the system further comprises means for cutting the pipe insulation to a desired length. In some exemplary embodiments, the length is within the range of 0.5 feet to 12 feet.

In some exemplary embodiments, the preformed fibrous insulation material is a fiberglass mat having a thickness of less than 0.5 inches. In some exemplary embodiments, the fiberglass mat has a thickness of less than 0.25 inches. In some exemplary embodiments, the fiberglass mat has an area weight of less than 0.08 lb/ft$^2$. In some exemplary embodiments, the fiberglass mat has an area weight of less than 0.04 lb/ft$^2$.

In some exemplary embodiments, the system further comprises means for cutting a slit through the pipe insulation along an entire length of the pipe insulation.

In some exemplary embodiments, the system further comprises means for applying an outer jacket to the pipe insulation.

In some exemplary embodiments, at least one property of the insulation material varies through the thickness of the pipe insulation.

According to an exemplary embodiment, a method of forming pipe insulation is provided. The method comprises providing a first insulation material and a second insulation material; winding the first insulation material around a mandrel at least once until a desired thickness $t_1$ is achieved; winding the second insulation material around the first insulation material wound on the mandrel at least once until a desired thickness $t_2$ is achieved; and applying energy to the first insulation material and the second insulation material to form the pipe insulation having a thickness of $t_1+t_2$, wherein a property of the pipe insulation in the first region defined by the thickness $t_1$ is different from the property of the pipe insulation in the second region defined by the thickness $t_2$.

In some exemplary embodiments, at least one of the first insulation material and the second insulation material is made up of a plurality of layers of a preformed fiberglass mat. In some exemplary embodiments, the fiberglass mat has a thickness of less than 0.5 inches. In some exemplary embodiments, the fiberglass mat has a thickness of less than 0.25 inches. In some exemplary embodiments, the fiberglass mat has an area weight of less than 0.08 lb/ft$^2$. In some exemplary embodiments, the fiberglass mat has an area weight of less than 0.04 lb/ft$^2$.

In some exemplary embodiments, the method further comprises applying a binder to at least one of the first insulation material and the second insulation material.

In some exemplary embodiments, the method further comprises activating a binder in at least one of the first insulation material and the second insulation material prior to winding of the second insulation material.

In some exemplary embodiments, the thickness $t_1$ is within the range of 0.125 inches to 5.75 inches. In some exemplary embodiments, the thickness $t_2$ is within the range of 0.125 inches to 5.75 inches.

In some exemplary embodiments, the energy is thermal energy. In some exemplary embodiments, the thermal energy is applied to the first insulation material and the second insulation material within a temperature range of 75° F. to 700° F. for a duration of 2 seconds to 10 minutes.

In some exemplary embodiments, no binder is applied to the first insulation material or the second insulation material prior to spiral winding thereof. Instead, mechanical energy (e.g., needling) is used to mechanically entangle fibers in the first insulation material and/or fibers in the second insulation material prior to winding.

In some exemplary embodiments, the energy is applied to the first insulation material and the second insulation material while the second insulation material is being wound on the first insulation material.

The method further comprises removing the pipe insulation from the mandrel. In some exemplary embodiments, the energy is applied to at least one of the first insulation material and the second insulation material after the pipe insulation is removed from the mandrel. In some exemplary embodiments, the energy is applied to the first insulation material and the second insulation material after the pipe insulation is removed from the mandrel.

In some exemplary embodiments, the method further comprises cutting the pipe insulation to a desired length. In some exemplary embodiments, the length is within the range of 0.5 feet to 12 feet.

In some exemplary embodiments, the first insulation material is supplied from a first roll, and the second insulation material is supplied from a second roll.

In some exemplary embodiments, the property of the pipe insulation is its color. In some exemplary embodiments, the property of the pipe insulation is its R-value. In some exemplary embodiments, the property of the pipe insulation is its density. In some exemplary embodiments, the property of the pipe insulation is its porosity. In some exemplary embodiments, the property of the pipe insulation is its binder composition. In some exemplary embodiments, the property of the pipe insulation is its binder content (LOI). In some exemplary embodiments, the property of the pipe insulation is its mechanical properties (e.g., modulus, tensile strength). In some exemplary embodiments, the property of the pipe insulation is its temperature resistance. In some exemplary embodiments, the property of the pipe insulation is its moisture resistance.

In some exemplary embodiments, the method further comprises cutting a slit through the pipe insulation along an entire length of the pipe insulation.

In some exemplary embodiments, the method further comprises applying an outer jacket to the pipe insulation. In some exemplary embodiments, the method further comprises printing information relating to the pipe insulation on the outer jacket.

According to an exemplary embodiment, a method of forming pipe insulation is provided. The method comprises providing an insulation material comprising a first layer of insulating material and a second layer of insulating material; winding the insulation material around a mandrel at least once until a desired thickness t is achieved; applying energy to the insulation material to form the pipe insulation, wherein a property of the pipe insulation in the one or more regions defined by the first layer of insulating material through the thickness t is different from the property of the pipe insulation in the one or more regions defined by the second layer of insulating material through the thickness t.

In some exemplary embodiments, at least one of the first layer of insulating material and the second layer of insulating material is made up of a plurality of layers of a preformed fiberglass mat. In some exemplary embodiments, the preformed fiberglass mat has a thickness of less than 0.5 inches. In some exemplary embodiments, the preformed fiberglass mat has a thickness of less than 0.25 inches. In some exemplary embodiments, the preformed fiberglass mat has an area weight of less than 0.08 lb/ft$^2$. In some exemplary embodiments, the preformed fiberglass mat has an area weight of less than 0.04 lb/ft$^2$.

In some exemplary embodiments, the method further comprises applying a binder to the insulation material.

In some exemplary embodiments, the method further comprises activating a binder in the insulation material prior to winding of the insulation material.

In some exemplary embodiments, no binder is applied to the layers of the insulation material prior to spiral winding of the layers. Instead, mechanical energy (e.g., needling) is used to form the insulation material prior to spiral winding of the layers.

In some exemplary embodiments, the thickness t is within the range of 0.125 inches to 6 inches.

In some exemplary embodiments, the energy is thermal energy. In some exemplary embodiments, the thermal energy is applied to the insulation material within a temperature range of 75° F. to 700° F. for a duration of 2 seconds to 10 minutes.

In some exemplary embodiments, the method further comprises removing the pipe insulation from the mandrel. In some exemplary embodiments, the energy is applied to the insulation material after the pipe insulation is removed from the mandrel.

In some exemplary embodiments, the method further comprises cutting the pipe insulation to a desired length. In some exemplary embodiments, the length is within the range of 0.5 feet to 12 feet.

In some exemplary embodiments, the insulation material is supplied from a single roll.

In some exemplary embodiments, the property of the pipe insulation is its color. In some exemplary embodiments, the property of the pipe insulation is its R-value. In some exemplary embodiments, the property of the pipe insulation is its density. In some exemplary embodiments, the property of the pipe insulation is its porosity. In some exemplary embodiments, the property of the pipe insulation is its porosity. In some exemplary embodiments, the property of the pipe insulation is its binder composition. In some exemplary embodiments, the property of the pipe insulation is its binder content (LOI). In some exemplary embodiments, the property of the pipe insulation is its mechanical properties (e.g., modulus, tensile strength). In some exemplary embodiments, the property of the pipe insulation is its temperature resistance. In some exemplary embodiments, the property of the pipe insulation is its moisture resistance.

In some exemplary embodiments, the method further comprises cutting a slit through the pipe insulation along an entire length of the pipe insulation.

In some exemplary embodiments, the method further comprises applying an outer jacket to the pipe insulation. In some exemplary embodiments, the method further comprises printing information relating to the pipe insulation on the outer jacket.

In some exemplary embodiments, the insulation material comprises a third layer of insulating material, wherein the third layer of insulating material is different from the first layer of insulating material and the second layer of insulating material.

In some exemplary embodiments, the insulation material comprises a third layer of insulating material, wherein the third layer of insulating material is the same as one of the first layer of insulating material and the second layer of insulating material, and wherein the third layer of insulating material is different from one of the first layer of insulating material and the second layer of insulating material.

In some exemplary embodiments, the insulation material comprises four or more layers of different insulating materials. In some exemplary embodiments, the insulation material comprises a plurality of layers of different insulating material and a plurality of layers of identical insulating material, wherein no two adjacent layers of insulating materials are the same.

According to an exemplary embodiment, a pipe insulation is provided. The pipe insulation comprises an elongated hollow cylinder of insulation material with a thickness of t inches, the thickness extending from an inner surface of the cylinder to an outer surface of the cylinder, wherein a property of the pipe insulation in a first region of the cylinder differs from the property of the pipe insulation in a second region of the cylinder, wherein the first region of the cylinder has a thickness of (t−x) inches, wherein the second region of the cylinder has a thickness of (t−y) inches, and wherein x+y=t. In some exemplary embodiments, x≠y.

In some exemplary embodiments, at least one of the first region of the cylinder and the second region of the cylinder comprises a plurality of layers of a preformed fiberglass mat. In some exemplary embodiments, the preformed fiberglass mat has a thickness of less than 0.5 inches. In some exemplary embodiments, the preformed fiberglass mat has a thickness of less than 0.25 inches. In some exemplary embodiments, the preformed fiberglass mat has an area weight of less than 0.08 lb/ft$^2$. In some exemplary embodiments, the preformed fiberglass mat has an area weight of less than 0.04 lb/ft$^2$.

In some exemplary embodiments, the elongated hollow cylinder has an inner cavity with a diameter in the range of 0.5 inches to 18 inches. In some exemplary embodiments, the thickness t is within the range of 0.125 inches to 6 inches.

In some exemplary embodiments, a length of the elongated hollow cylinder is within the range of 0.5 feet to 12 feet.

In some exemplary embodiments, the property of the pipe insulation is its color. In some exemplary embodiments, the property of the pipe insulation is its R-value. In some exemplary embodiments, the property of the pipe insulation is its density. In some exemplary embodiments, the property of the pipe insulation is its porosity. In some exemplary embodiments, the property of the pipe insulation is its porosity. In some exemplary embodiments, the property of the pipe insulation is its binder composition. In some exemplary embodiments, the property of the pipe insulation is its binder content (LOI). In some exemplary embodiments, the property of the pipe insulation is its mechanical properties (e.g., modulus, tensile strength). In some exemplary embodiments, the property of the pipe insulation is its temperature resistance. In some exemplary embodiments, the property of the pipe insulation is its moisture resistance.

In some exemplary embodiments, the pipe insulation further comprises a slit that extends through the pipe insulation along an entire length of the elongated hollow cylinder.

In some exemplary embodiments, the pipe insulation further comprises a jacket affixed to an outer surface of the elongated hollow cylinder. In some exemplary embodiments, information relating to the pipe insulation is printed on the jacket.

According to an exemplary embodiment, a pipe insulation is provided. The pipe insulation comprises an elongated hollow cylinder of insulation material with a thickness t, the thickness extending from an inner surface of the cylinder to an outer surface of the cylinder, wherein a plurality of regions are defined through the thickness t, each of the regions being concentric relative to a central axis of the elongated hollow cylinder, wherein a first region of the cylinder is adjacent to a second region of the cylinder, and wherein a property of the pipe insulation in the first region of the cylinder differs from the property of the pipe insulation in the second region of the cylinder.

In some exemplary embodiments, the property of the pipe insulation is its color. In some exemplary embodiments, the property of the pipe insulation is its R-value. In some exemplary embodiments, the property of the pipe insulation is its density. In some exemplary embodiments, the property of the pipe insulation is its porosity. In some exemplary embodiments, the property of the pipe insulation is its porosity. In some exemplary embodiments, the property of the pipe insulation is its binder composition. In some exemplary embodiments, the property of the pipe insulation is its binder content (LOI). In some exemplary embodiments, the property of the pipe insulation is its mechanical properties (e.g., modulus, tensile strength). In some exemplary embodiments, the property of the pipe insulation is its temperature resistance. In some exemplary embodiments, the property of the pipe insulation is its moisture resistance.

In some exemplary embodiments, a thickness $t_1$ of the first region is equal to a thickness $t_2$ of the second region. In some exemplary embodiments, a thickness $t_1$ of the first region is less than a thickness $t_2$ of the second region.

In some exemplary embodiments, a third region of the cylinder is adjacent to the second region of the cylinder, wherein a property in the third region of the cylinder differs from the property in at least one of the first region of the cylinder and the second region of the cylinder. In some exemplary embodiments, a thickness $t_3$ of the third region is equal to the thickness $t_1$ of the first region. In some exemplary embodiments, a thickness $t_3$ of the third region is equal to the thickness $t_2$ of the second region. In some exemplary embodiments, a thickness $t_3$ of the third region is less than the thickness $t_1$ of the first region. In some exemplary embodiments, a thickness $t_3$ of the third region is less than the thickness $t_2$ of the second region.

In some exemplary embodiments, a third region of the cylinder is adjacent to the second region of the cylinder, wherein a property in the third region of the cylinder differs from the property in both the first region of the cylinder and the second region of the cylinder. In some exemplary embodiments, a thickness $t_3$ of the third region is equal to the thickness $t_1$ of the first region. In some exemplary embodiments, a thickness $t_3$ of the third region is equal to the thickness $t_2$ of the second region. In some exemplary embodiments, a thickness $t_3$ of the third region is less than the thickness $t_1$ of the first region. In some exemplary embodiments, a thickness $t_3$ of the third region is less than the thickness $t_2$ of the second region.

In some exemplary embodiments, a third region of the cylinder is adjacent to the second region of the cylinder, wherein a property in the third region of the cylinder differs from the property in the second region of the cylinder, and wherein the property in the third region of the cylinder is the same as the property in the first region of the cylinder. In some exemplary embodiments, a thickness $t_3$ of the third region is equal to the thickness $t_1$ of the first region. In some exemplary embodiments, a thickness $t_3$ of the third region is equal to the thickness $t_2$ of the second region. In some exemplary embodiments, a thickness $t_3$ of the third region is less than the thickness $t_1$ of the first region. In some exemplary embodiments, a thickness $t_3$ of the third region is less than the thickness $t_2$ of the second region.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
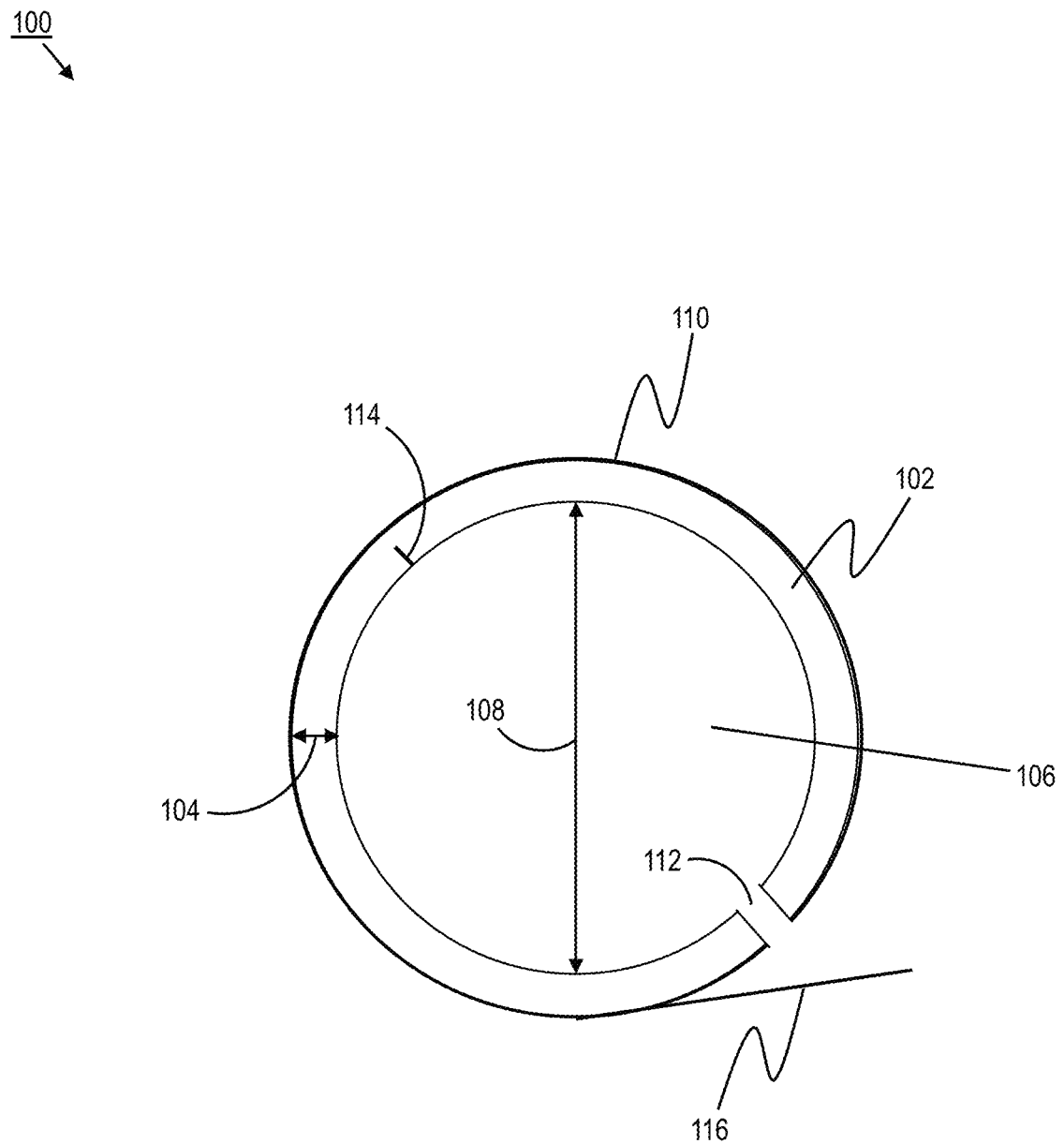
FIG. 1 is a front elevational view of conventional pipe insulation, with said view being aligned with a lengthwise axis of the pipe insulation.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass methods of and systems for forming pipe insulation, wherein the properties of the pipe insulation can be adjusted or otherwise varied through the thickness of the pipe insulation. Preferably, but not necessarily, the process is a continuous process.

Figure 2:
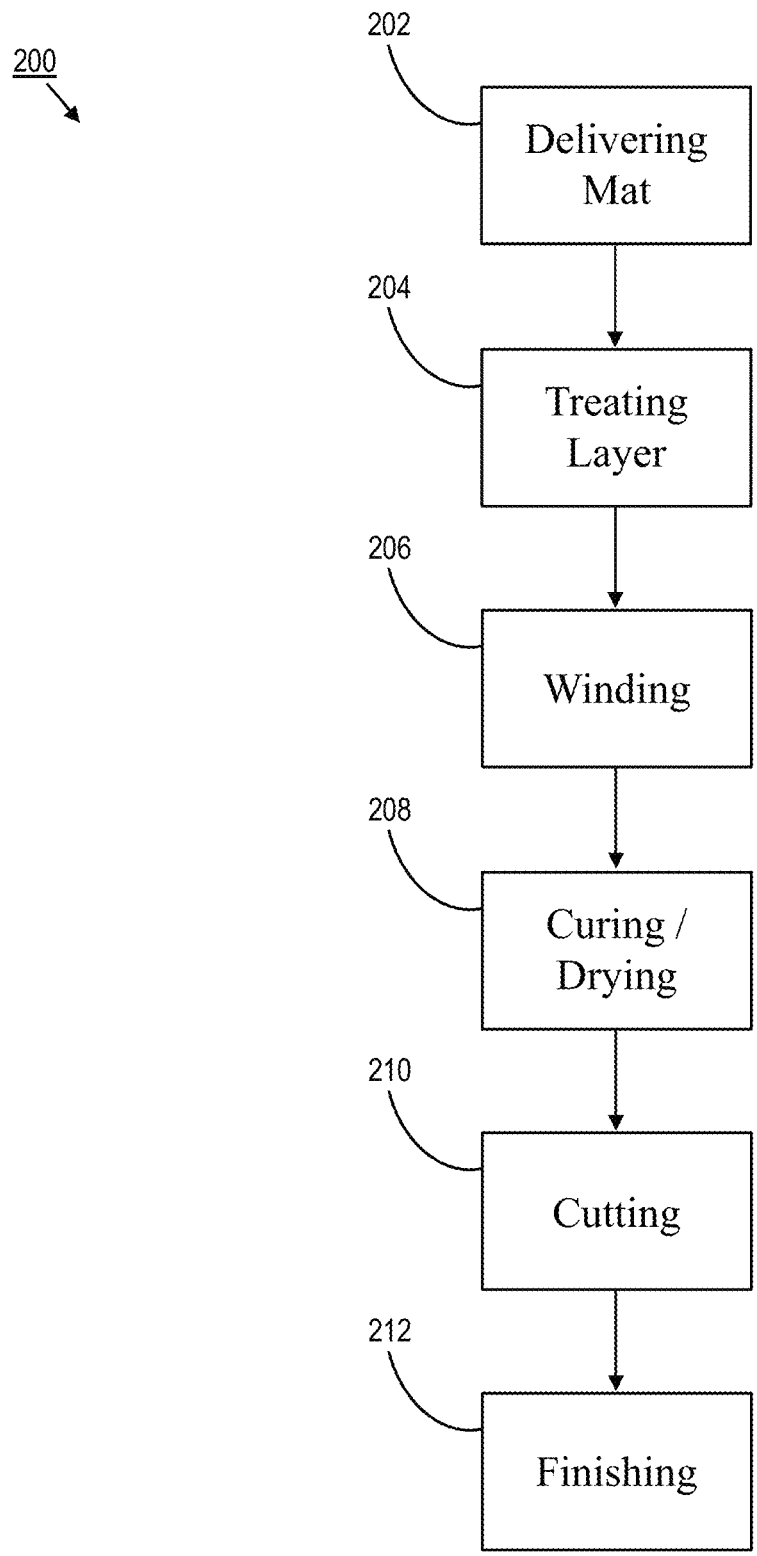
FIG. 2 is a flowchart of a method of forming pipe insulation using a preformed fiberglass mat, according to an exemplary embodiment.

As shown in FIG. 2, a method 200 of forming pipe insulation, according to an exemplary embodiment, is disclosed. The method 200 uses a preformed, non-woven fiberglass mat as its input material. This mat differs from the fiberglass pelts that are often used in conventional pipe insulation formation processes. For example, the mat is preformed in that the binder forming the mat is fully or at least partially cured, while the pelt is unformed in that its binder has not yet been cured. Furthermore, the mat will typically have a thickness less than 0.5 inches and an area weight less than 0.08 lb/ft$^2$. In some exemplary embodiments, the mat will typically have a thickness less than 0.25 inches and an area weight less than 0.04 lb/ft$^2$. The fiberglass mat is usually stored on a roll. In this manner, one or more rolls can be used to deliver the mat to a winder in step 202.

Before the mat reaches the winder, the mat undergoes a layer treatment in step 204. The layer treatment step can involve, for example, application and/or activation of a layer binder to the mat so that different layers of the mat can be adhered to one another (when the binder is cured) to form the pipe insulation. Any suitable binder may be used. For example, the binder may be a thermoplastic resin or a thermoset resin. The layer binder can be applied to the mat in any suitable manner, such as roll coating, spray coating, or dip coating.

As another example, the layer treatment step can involve alignment of the mat (i.e., changing its approach angle) as it is delivered to the winder. As yet another example, the layer treatment step can involve alteration (e.g., chemical, physical) of the mat prior to reaching the winder. In one exemplary embodiment, the alteration of the mat results in the layer having a specific color. These examples of processing at the layer treatment step are not exhaustive and this step can encompass any processing to the input fiberglass mat material before it is introduced to the winder in step 206.

After the layer treatment, the mat continues on to the winder where it is spiral wound onto a mandrel that may be stationary or rotating about an axis in step 206. Spiral winding technology is known in the art and has been previously used, for example, to make paper cores/tubes. A thickness of the pipe insulation is controlled based on a thickness of the mat and the number of layers of the mat wound on the mandrel. Typically, many layers of the mat will be used to form the pipe insulation. In some exemplary embodiments, 2 layers to 24 layers of the mat are used to form the pipe insulation. In some exemplary embodiments, 4 layers to 16 layers of the mat are used to form the pipe insulation. In some exemplary embodiments, 4 layers to 8 layers of the mat are used to form the pipe insulation. In some exemplary embodiments, the thickness of the pipe insulation is within the range of 0.125 inches to 6 inches. In some exemplary embodiments, the thickness of the pipe insulation is within the range of 0.25 inches to 4 inches. In some exemplary embodiments, the thickness of the pipe insulation is within the range of 0.5 inches to 2 inches.

Once a desired thickness for the pipe insulation is achieved (e.g., a predetermined number of layers of the mat are spiral wound on the mandrel), the pipe insulation undergoes thermal treatment in step 208. The thermal treatment cures the layer binder to fix the various layers of the mat to one another, thereby forming the pipe insulation material. One of ordinary skill in the art will appreciate that other forms of energy, such as radiation (e.g., UV, IR, microwave), might be used to cure the layer binder without departing from the spirit and scope of the general inventive concepts.

In some exemplary embodiments, the mat may be made with a binder that can be subsequently re-heated or otherwise activated to fuse the different layers of mats to one another in the finished product. In some exemplary embodiments, the mat itself may include binder fibers embedded therein, wherein the thermal treatment melts these binder fibers to fix the various layers of the mat to one another. The thermal treatment can be applied to the mat in any suitable manner.

In some exemplary embodiments, the thermal treatment is applied to the layers of the mat as they are being wound on the mandrel, such as by heating the mandrel and/or by an external heating means (e.g., one or more heaters) situated in proximity to the mandrel. In some exemplary embodiments, the thermal treatment is applied to the layers of the mat as they are conveyed from the mandrel, such as by conveying the layers through an oven or other arrangement of heaters.

In general, the thermal treatment is applied at a sufficient temperature (e.g., 75° F. to 700° F.) and for a sufficient time (e.g., 2 seconds to 10 minutes) so as to cure the layer binder to fix the various layers of the mat to one another or to at least increase the tendency of the layers of mat to adhere to one another.

After curing the layer binder, the resulting insulation material is cut to length in step 210 to provide an elongated hollow cylinder having a desired length. The cylinder is formed from the layers of the fiberglass mat. In some exemplary embodiments, the insulation material is cut to a length of 0.5 feet to 12 feet.

The insulation material may be cut in any suitable manner. In some exemplary embodiments, the insulation material is cut as it is conveyed off of the mandrel (i.e., in-line). In this case, the cutter will typically be moving in the same direction and at the same speed as the insulation material as the cutting occurs. Also, since the insulation material will still be rotating about the z-axis, a cutter or blade can be applied at a fixed position relative to the insulation material to complete the cutting. In some exemplary embodiments, the insulation material is cut further downstream of the mandrel, either as part of the continuous process (i.e., in-line) or later in time and/or at another location (i.e., off-line).

With the insulation material cut to the desired length, it then undergoes any finishing necessary for or otherwise associated with creation of the pipe insulation product in step 212. The finishing step can involve, for example, formation of a lengthwise slit through the insulation material that facilitates placement of the insulation material around a pipe or similar member to be insulated. As another example, the finishing step can involve application of a jacket or other cover member around the outer periphery of the insulation material. Typically, if the outer jacket is applied after the lengthwise slit is formed in the insulation material, the outer jacket will not cover the slit (at least not until after installation of the pipe insulation). The outer jacket acts as, amongst other things, a vapor barrier for the pipe insulation. As yet another example, the finishing step can involve printing of indicia on the insulation material, the outer jacket, and/or any associated packaging. The indicia can be any information relating to the insulation material, for example, its R-value, its thickness, its length, a SKU, installation instructions, etc. The printing could be done in any suitable manner, such as via ink jet. As still another example, the finishing step can involve packaging the pipe insulation, such as boxing it or enclosing it in plastic wrap. These examples of processing at the finishing step are not exhaustive and this step can encompass any processing to the insulation material after it has been cut to length in step 210. Furthermore, some or all of the processing at the finishing step can be part of the continuous process (i.e., in-line) or occur later in time and/or at another location (i.e., off-line).

Figure 3:
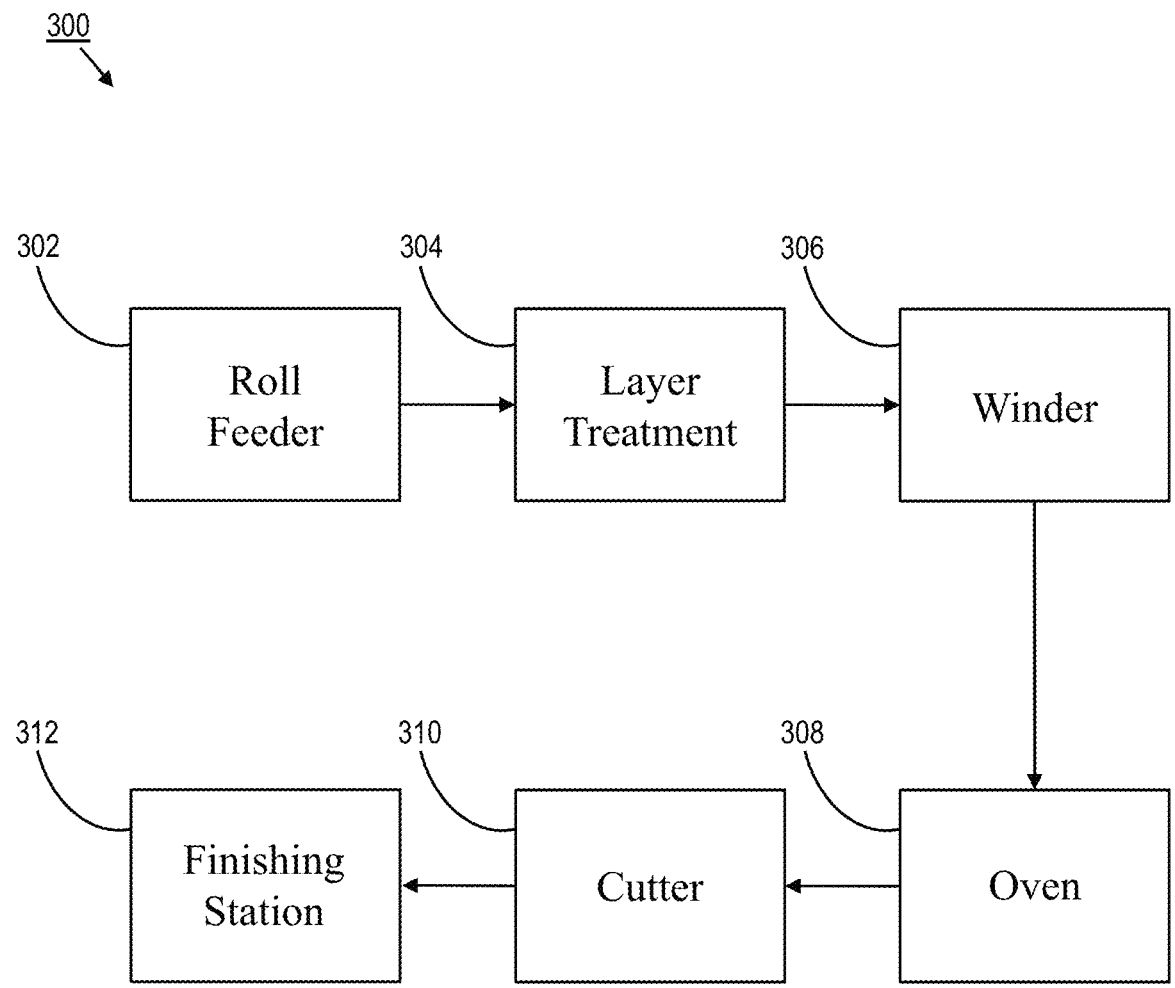
FIG. 3 is a diagram of a system for forming pipe insulation using a preformed fiberglass mat, according to an exemplary embodiment.

As shown in FIG. 3, a system 300 for forming pipe insulation, according to an exemplary embodiment, is disclosed. The system 300 can be used to implement a method of forming pipe insulation encompassed by the general inventive concepts, such as the method 200.

The system 300 uses a preformed, non-woven fiberglass mat 330 as its input material. This mat 330 differs from the fiberglass pelts that are often used in conventional pipe insulation formation processes. For example, the mat 330 is preformed in that the binder forming the mat is fully or at least partially cured, while the pelt is unformed in that its binder has not yet been cured. Thus, the mat 330 can be readily stored (e.g., on rolls) until needed. Furthermore, the mat 330 will typically have a thickness less than 0.5 inches and an area weight less than 0.08 lb/ft$^2$. In some exemplary embodiments, the mat 330 has a thickness less than 0.25 inches and an area weight less than 0.04 lb/ft$^2$. As noted above, the fiberglass mat 330 is usually stored on a roll. Accordingly, the system 300 includes a roll feeder 302 that interfaces with one or more rolls of fiberglass mat for feeding multiple layers 332 of the mat 330 toward a winder 306 (see FIG. 4).

Before the mat 330 reaches the winder 306, the mat 330 is processed by a layer treatment apparatus 304, subsystem, or the like, or at a layer treatment station. The processing by the layer treatment apparatus 304 will typically result in a physical and/or chemical alteration of the mat 330 forming a particular one of the layers 332. In some exemplary embodiments, the system 300 includes multiple layer treatment apparatuses 304 for processing the mat layers 332 prior to delivery to the winder 306. The layer treatment processing can involve, for example, application and/or activation of a layer binder to the mat 330 so that different layers 332 of the mat 330 can be adhered to one another (when the binder is cured) to form the pipe insulation. Any suitable binder may be used. For example, the binder may be a thermoplastic resin or a thermoset resin. The layer binder can be applied to the mat 330 in any suitable manner, such as roll coating, spray coating, or dip coating. As another example, the layer treatment processing can involve alignment of the mat 330 (i.e., changing its approach angle θ) as it is delivered to the winder 306. As yet another example, the layer treatment processing involves applying a color to or otherwise changing a color of the mat 330. These examples of processing by the layer treatment apparatus 304 are not exhaustive and the general inventive concepts encompass any other processing to the input fiberglass mat material before it is introduced to the winder 306.

Figure 4:
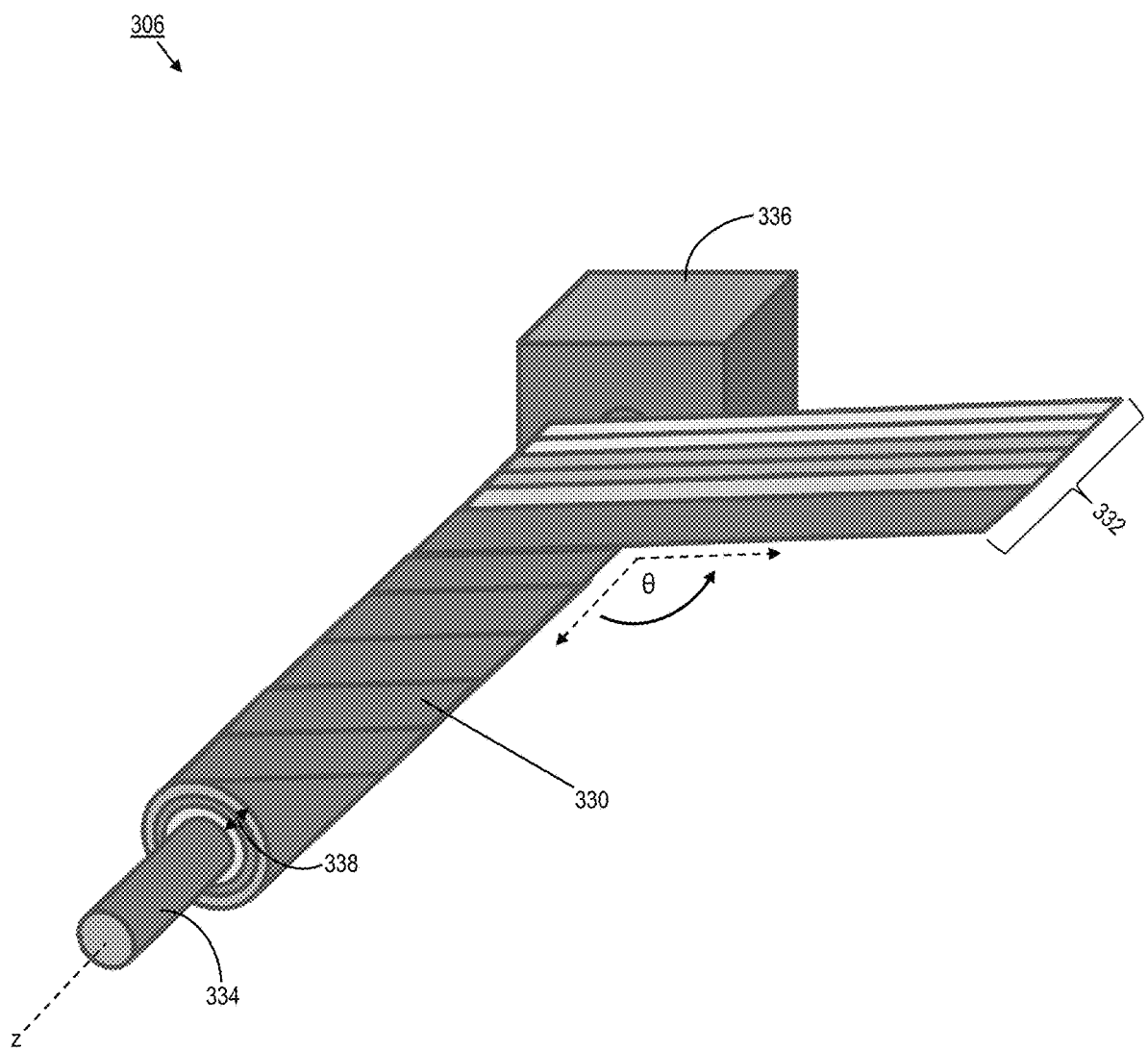
FIG. 4 is a diagram showing layers of a fiberglass mat being spiral wound onto a mandrel, according to an exemplary embodiment.

After the layer treatment process, the mat 330 continues on to the winder 306 where it is spiral wound onto a mandrel 334 that may be stationary or rotating about an axis z (see FIG. 4). In the case of a rotating mandrel, a motor 336 and associated circuitry drive rotation of the mandrel 334. The mandrel 334 rotates at a speed of 0.5 rpm to 500 rpm. Spiral winding technology is known in the art and has been previously used, for example, to make paper cores/tubes. A thickness 338 of the pipe insulation is controlled based on a thickness of the mat 330 and the number of layers 332 of the mat 330 wound on the mandrel 334. Typically, many layers 332 of the mat 330 will be used to form the pipe insulation. In some exemplary embodiments, 2 layers to 24 layers of the mat 330 are used to form the pipe insulation. In some exemplary embodiments, 4 layers to 16 layers of the mat 330 are used to form the pipe insulation. In some exemplary embodiments, 4 layers to 8 layers of the mat 330 are used to form the pipe insulation. In some exemplary embodiments, the thickness of the pipe insulation is within the range of 0.125 inches to 6 inches. In some exemplary embodiments, the thickness of the pipe insulation is within the range of 0.25 inches to 4 inches. In some exemplary embodiments, the thickness of the pipe insulation is within the range of 0.5 inches to 2 inches.

In some exemplary embodiments, a jacket (e.g., jacket 610) or other cover member is spiral wound onto the pipe insulation by the winder 306, once a desired thickness of the pipe insulation is achieved. In such an in-line process, the last few (e.g., two) layers wrapped on the mandrel 334 are an adhesive-backed jacketing material.

Once a predetermined number of layers 332 of the mat 330 are spiral wound on the mandrel 334 (i.e., a desired thickness 338 for the pipe insulation is achieved), the pipe insulation undergoes thermal treatment. The thermal treatment cures the layer binder to fix the various layers of the mat to one another, thereby forming the pipe insulation material. The thermal treatment can be applied to the mat in any suitable manner.

In some exemplary embodiments, the thermal treatment is applied to the layers of the mat as they are being wound on the mandrel, such as by heating the mandrel and/or by an external heating means (e.g., one or more heaters) situated in proximity to the mandrel. In some exemplary embodiments, the thermal treatment is applied to the layers of the mat as they are conveyed from the mandrel, such as by conveying the layer through an oven 308 or other arrangement of heaters.

In general, the thermal treatment is applied at a sufficient temperature (e.g., 75° F. to 700° F.) and for a sufficient time (e.g., 2 seconds to 10 minutes) so as to cure the layer binder to fix the various layers 332 of the mat 330 to one another or to at least increase the tendency of the layers of mat 332 to adhere to one another.

Figure 5:
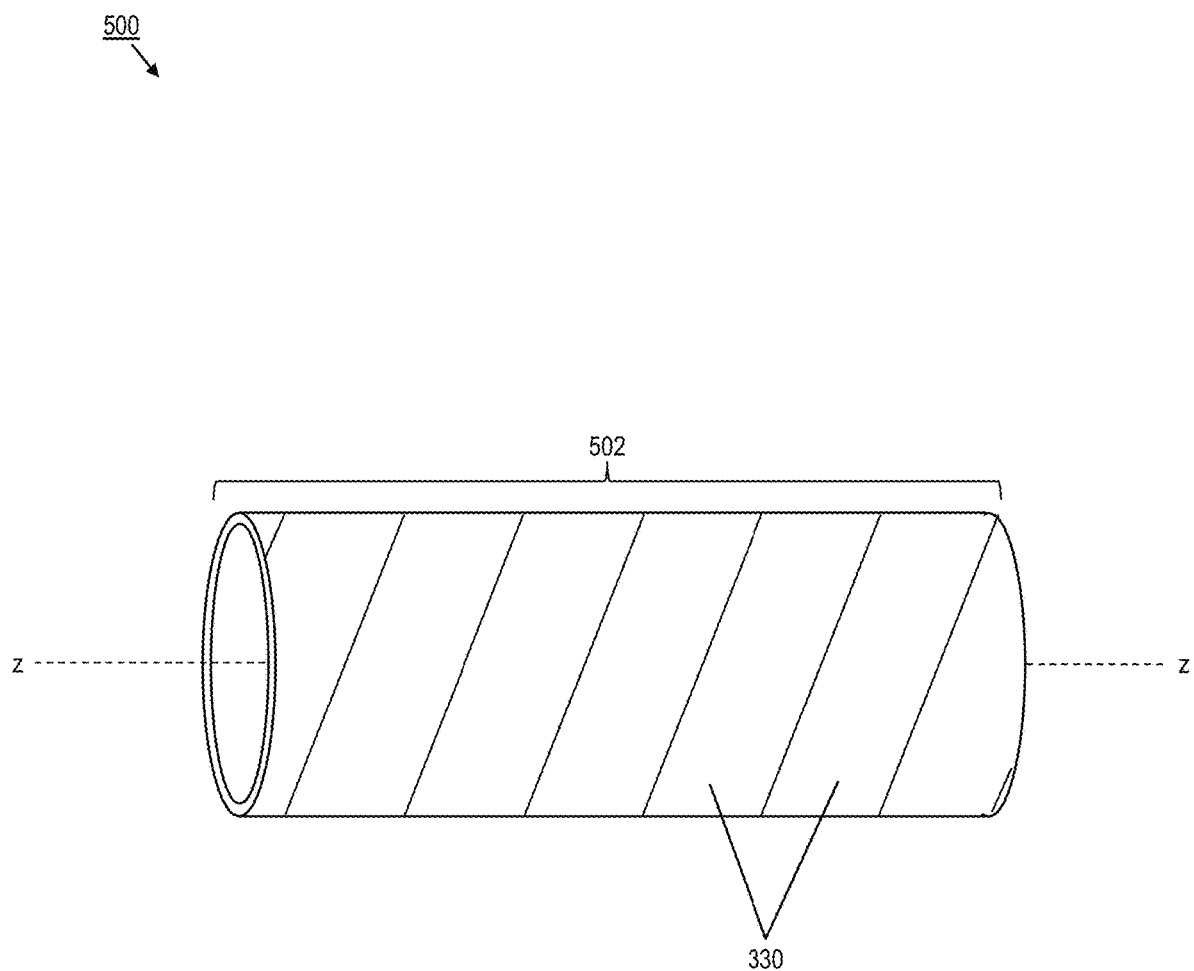
FIG. 5 is a side perspective view of the inventive pipe insulation, according to an exemplary embodiment.

After curing the layer binder, a cutter 310 cuts the resulting insulation material to provide an elongated hollow cylinder 500 having a desired length 502, as shown in FIG. 5. In other words, the cutter 310 separates a portion of the insulating material being continuously formed on the mandrel 334, wherein the separated portion has a length 502. The cylinder 500 is formed from the layers 332 of the fiberglass mat 330. In some exemplary embodiments, the insulation material is cut to a length of 0.5 feet to 12 feet.

The insulation material may be cut in any suitable manner, such as by a rotating knife, a fixed blade, etc. In some exemplary embodiments, the insulation material is cut as it is conveyed off of the mandrel (i.e., in-line). In this case, the cutter 310 will typically be moving in the same direction and at the same speed as the insulation material while the cutting occurs. Also, since the insulation material will still be rotating about the z-axis, the cutter 310 can be applied at a fixed position relative to the insulation material to complete the cutting. In some exemplary embodiments, the insulation material is cut further downstream of the mandrel, either as part of the continuous process (i.e., in-line) or later in time and/or at another location (i.e., off-line).

With the insulation material cut to the desired length, it is processed by a finishing apparatus, subsystem, or the like, or at a finishing station 312. The finishing station 312 handles any processing necessary for or otherwise associated with creation of the pipe insulation product. The finishing processing can involve, for example, formation of a lengthwise slit (e.g., slit 612) through the insulation material that facilitates placement of the insulation material around a pipe or similar member to be insulated. As another example, the finishing processing can involve application of a jacket (e.g., jacket 610) or other cover member around the outer periphery of the insulation material. Typically, if the outer jacket is applied after the lengthwise slit is formed in the insulation material, the outer jacket will not cover the slit (at least not until after installation of the pipe insulation). The outer jacket acts as, amongst other things, a vapor barrier for the pipe insulation. As yet another example, the finishing processing can involve printing of indicia on the insulation material, the outer jacket, and/or any associated packaging. The indicia can be any information relating to the insulation material, for example, its R-value, its thickness, its length, a SKU, installation instructions, etc. The printing could be done in any suitable manner, such as via an ink jet printer. As still another example, the finishing processing can involve packaging the pipe insulation, such as boxing it or enclosing it in plastic wrap. These examples of finishing processing are not exhaustive but instead can encompass any processing to the insulation material after it has been cut to length. Furthermore, some or all of the finishing processing be part of the continuous system operation (i.e., in-line) or occur later in time and/or at another location (i.e., off-line).

According to the general inventive concepts (e.g., the method 200 and the system 300), the number of wound layers 332 of the fiberglass mat 330 dictates the wall thickness 338 of the pipe insulation. Consequently, pipe insulation of various thicknesses can be readily produced. Additionally, since the fiberglass mat 300 is preformed, the method 200 and the system 300 avoid the need for any co-located glass manufacturing. As a result, the production time, necessary infrastructure and raw materials, and possible problems associated with onsite glass production can be avoided. Furthermore, the pre-made fiberglass mat 330 allows for generally uniform fiber distribution in the pipe insulation. Furthermore, the spiral winding technique allows for continuous processing that approximates the throughput rates of conventional CMP processes.

Additionally, the general inventive concepts (e.g., the method 200 and the system 300) allow for the properties of the resulting pipe insulation to be "tuned" through the thickness of the pipe insulation. In other words, because the pipe insulation is built up from many discrete layers of the fiberglass mat, the pipe insulation can be constructed to have different physical properties in different layers (i.e., through the thickness of the pipe insulation).

Figure 6:
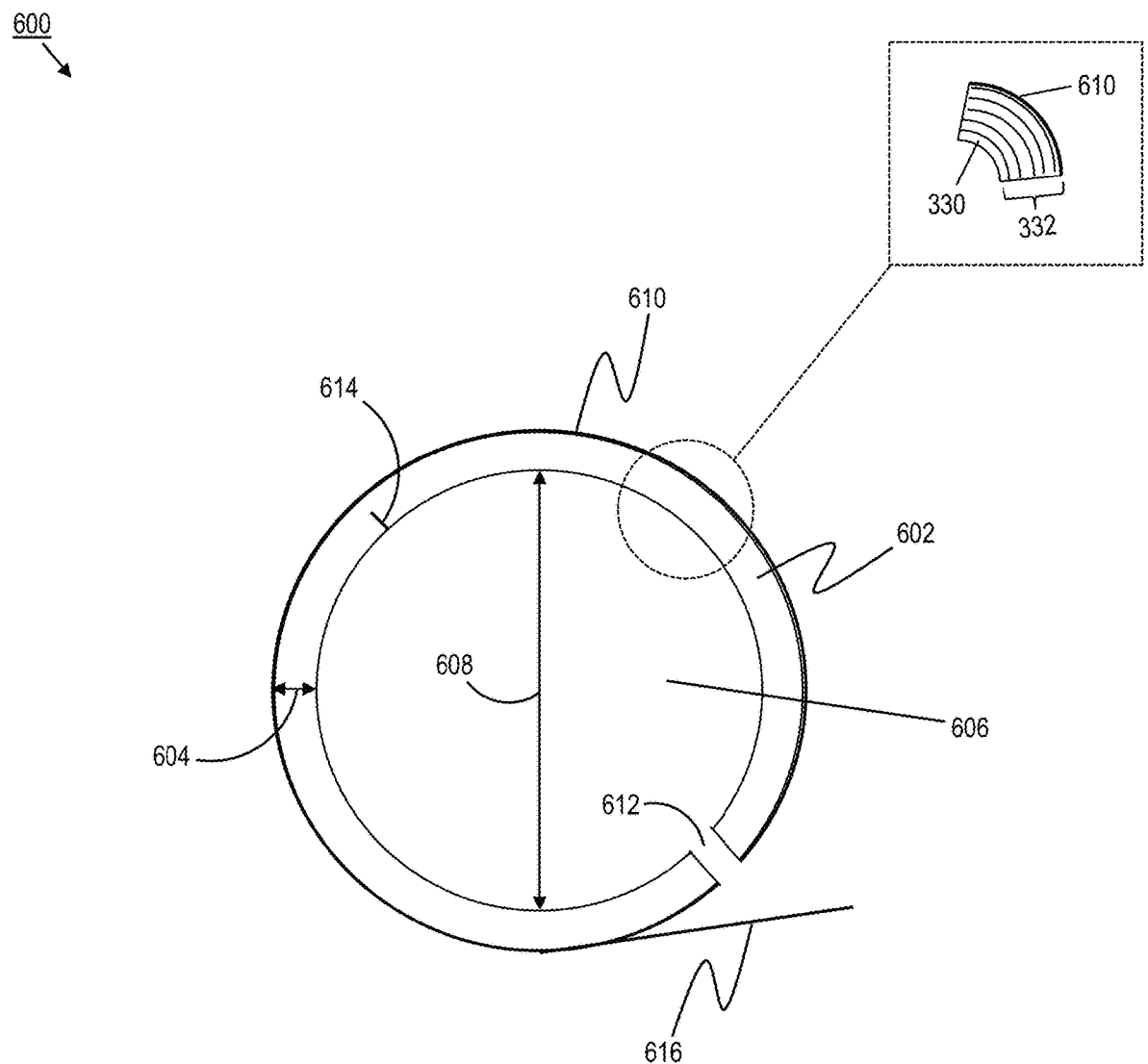
FIG. 6 is a front elevational view of the inventive pipe insulation, according to an exemplary embodiment, with said view being aligned with a lengthwise axis of the pipe insulation.

For example, as shown in FIG. 6, pipe insulation 600 formed according to an exemplary method (e.g., the method 200) and/or an exemplary system (e.g., the system 300) is formed from an insulating material 602 made up of multiple layers 332 of a preformed, non-woven fiberglass mat 330. The pipe insulation 600 is formed as an elongated hollow cylinder having a wall thickness 604 and an inner cavity 606. According to the general inventive concepts, the wall thickness 604 can be readily varied by using mat 330 having a particular thickness and/or changing the number of layers 332 of the mat 330 used to form the pipe insulation 600. The inner cavity 606 defines an inner diameter 608 of the pipe insulation 600. According to the general inventive concepts, the inner diameter 608 can be readily varied by using a mandrel 334 having a corresponding outer diameter. The inner diameter 608 of the pipe insulation 600 is selected to match an outer diameter of a pipe or pipe-like member to be insulated.

An outer jacket 610 is wrapped around the insulating material 602 and acts as, amongst other things, a vapor barrier for the pipe insulation 600. A slit 612 is formed through the insulating material 602 and the outer jacket 610 to facilitate placement of the pipe insulation 600 around the pipe. To further facilitate installation of the pipe insulation 600, a partial slit 614 can also be formed, usually on an opposite side of the insulating material 602 from the slit 612. The partial slit 614 typically does not extend through the entire thickness 604 of the insulating material 602 (and does not breach the outer jacket 610). After the pipe insulation 600 is fitted around the pipe, a portion of the outer jacket 610 forms a cover 616 that extends over (and seals) the slit 612. In some exemplary embodiments, in addition to or instead of the cover 616, the slit 612 is sealed by tape (not shown) or the like.

In this exemplary embodiment, the properties of the insulating material 602 are substantially homogeneous through the wall thickness 604 of the pipe insulation 600.

Figure 7:
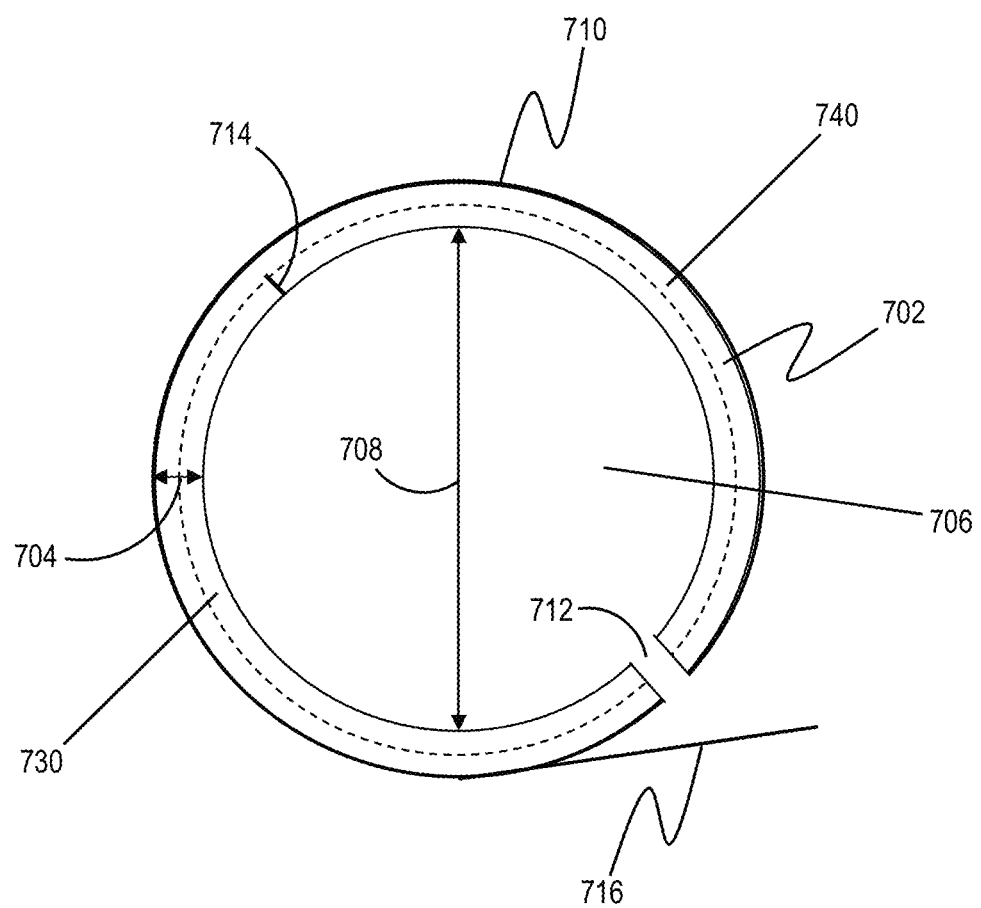
FIG. 7 is a front elevational view of the inventive pipe insulation, according to another exemplary embodiment, with said view being aligned with a lengthwise axis of the pipe insulation.

Conversely, as shown in FIG. 7, pipe insulation 700 formed according to an exemplary method (e.g., the method 200) and/or an exemplary system (e.g., the system 300) is formed from an insulating material 702 made up, at least in part, of multiple layers 332 of a preformed, non-woven fiberglass mat 330. The pipe insulation 700 is formed as an elongated hollow cylinder having a wall thickness 704 and an inner cavity 706. According to the general inventive concepts, the wall thickness 704 can be readily varied by using mat 330 having a particular thickness and/or changing the number of layers 332 of the mat 330 used to form the pipe insulation 700. The inner cavity 706 defines an inner diameter 708 of the pipe insulation 700. According to the general inventive concepts, the inner diameter 708 can be readily varied by using a mandrel 334 having a corresponding outer diameter. The inner diameter 708 of the pipe insulation 700 is selected to match an outer diameter of a pipe or pipe-like member to be insulated.

An outer jacket 710 is wrapped around the insulating material 702 and acts as, amongst other things, a vapor barrier for the pipe insulation 700. A slit 712 is formed through the insulating material 702 and the outer jacket 710 to facilitate placement of the pipe insulation 700 around the pipe. To further facilitate installation of the pipe insulation 700, a partial slit 714 can also be formed, usually on an opposite side of the insulating material 702 from the slit 712. The partial slit 714 typically does not extend through the entire thickness 704 of the insulating material 702 (and does not breach the outer jacket 710). After the pipe insulation 700 is fitted around the pipe, a portion of the outer jacket 710 forms a cover 716 that extends over (and seals) the slit 712. In some exemplary embodiments, in addition to or instead of the cover 716, the slit 712 is sealed by tape (not shown) or the like.

In this exemplary embodiment, the properties of the insulating material 702 are not homogeneous through the wall thickness 704 of the pipe insulation 700. Instead, different physical properties can be introduced through the wall thickness 704 of the pipe insulation 700 (or some sub-set of the wall thickness 704) by using the same insulation material, such as the insulating material 702 comprising multiple layers 332 of the preformed, non-woven fiberglass mat 330, wherein different layers of the mat 330 have been formed, or otherwise previously altered (e.g., in the layer treatment step 204), to have different properties. As a result, a first (i.e., an inner) region 730 of the wall thickness 704 has one or more different properties than a second (i.e., an outer) region 740 of the wall thickness 704.

Any number of properties can differ between the first region 730 and the second region 740. For example, and not by way of limitation, such properties could include one or more of a glass type used to form the mat 330, a sizing applied to the glass used to form the mat 330, a binder used to form the mat 330, a fiber diameter used to form the mat 330, a fiber form (e.g., chopped, continuous) used to form the mat 330, an orientation of the fibers within the mat, a thickness of the individual layers of the mat 330, a density of the mat 330, an R-value of the mat 330, etc. As another example, such properties could be altered after the mat is formed 330, such as applying a color to a layer (or consecutive layers) of the mat 330.

Additionally, different physical properties can be introduced through the wall thickness 704 of the pipe insulation 700 (or some sub-set of the wall thickness 704) by using different insulation materials as input to the forming method/system, wherein at least one of the insulation materials being a preformed, non-woven mat (e.g., the mat 330) that is spirally wound in multiple layers to build up the wall thickness (or sub-set thereof). In this case, a first (e.g., an inner) region 730 of the wall thickness 704 is formed from a first insulation material, while a second (e.g., an outer) region 740 of the wall thickness 704 is formed from a second insulation material (e.g., the mat 330). Such an embodiment is illustrated in FIG. 8.

Figure 8:
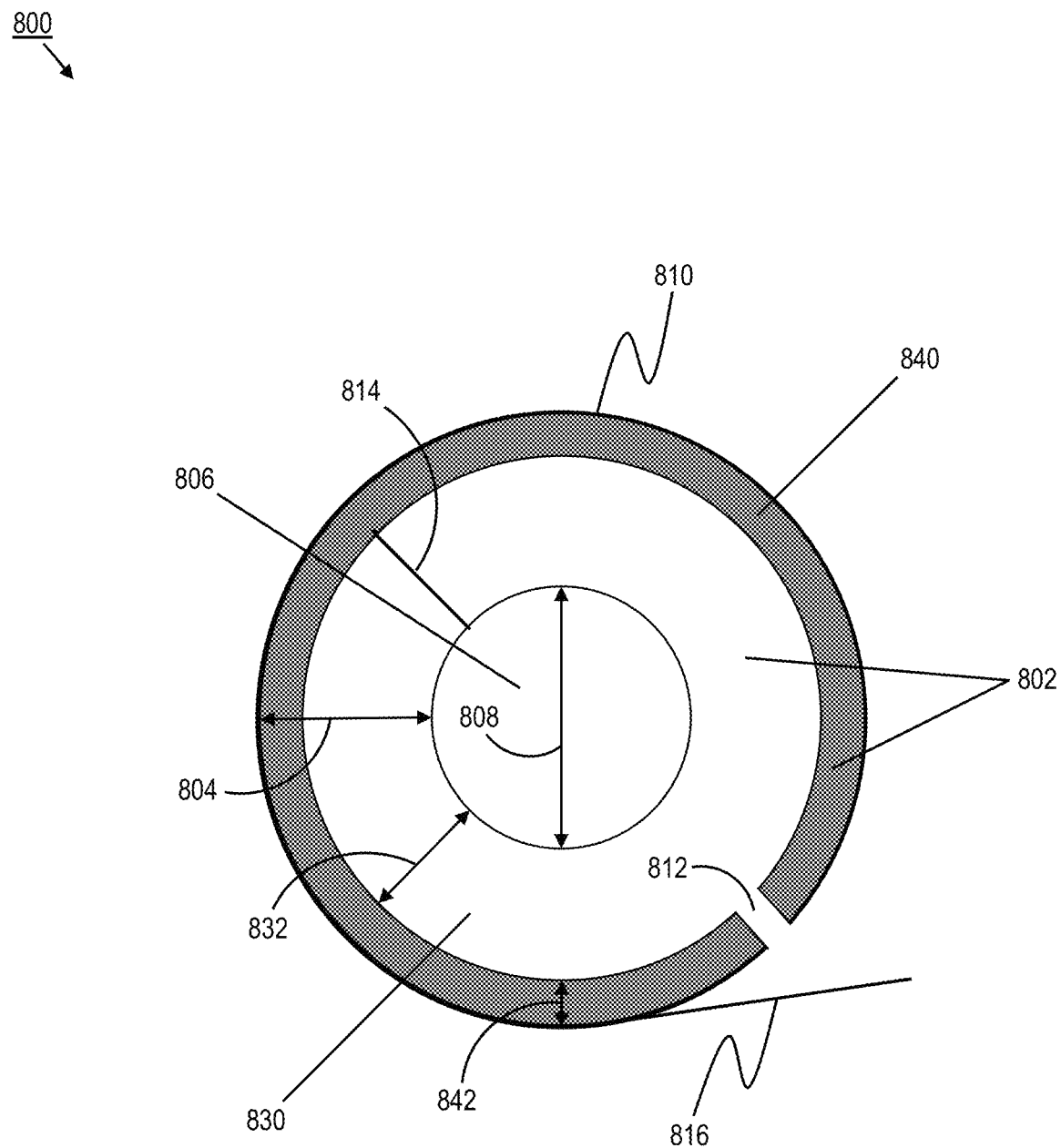
FIG. 8 is a front elevational view of the inventive pipe insulation, according to yet another exemplary embodiment, with said view being aligned with a lengthwise axis of the pipe insulation.

As shown in FIG. 8, pipe insulation 800 formed according to an exemplary method (e.g., the method 200) and/or an exemplary system (e.g., the system 300) is formed from two different types of insulating material 802, i.e., a first insulating material 830 and a second insulating material 840.

The pipe insulation 800 is formed as an elongated hollow cylinder having a wall thickness 804 and an inner cavity 806. The inner cavity 806 defines an inner diameter 808 of the pipe insulation 800. According to the general inventive concepts, the inner diameter 808 can be readily varied by using a mandrel 334 having a corresponding outer diameter. The inner diameter 808 of the pipe insulation 800 is selected to match an outer diameter of a pipe or pipe-like member to be insulated.

An outer jacket 810 is wrapped around the insulating material 802 and acts as, amongst other things, a vapor barrier for the pipe insulation 800. A slit 812 is formed through the insulating material 802 and the outer jacket 810 to facilitate placement of the pipe insulation 800 around the pipe. To further facilitate installation of the pipe insulation 800, a partial slit 814 can also be formed, usually on an opposite side of the insulating material 802 from the slit 812. The partial slit 814 typically does not extend through the entire thickness 804 of the insulating material 802 (and does not breach the outer jacket 810). After the pipe insulation 800 is fitted around the pipe, a portion of the outer jacket 810 forms a cover 816 that extends over (and seals) the slit 812. In some exemplary embodiments, in addition to or instead of the cover 816, the slit 812 is sealed by tape (not shown) or the like.

In this exemplary embodiment, the properties of the insulating material 802 are not homogeneous through the wall thickness 804 of the pipe insulation 800. Instead, as noted above, different types of insulating material 802 are used. For example, the first insulating material 830 is a pre-made sheet of insulation (e.g., a fiberglass batt). The first insulating material 830 could be wound around the mandrel 334, such as by spiral winding. Alternatively, since the first insulating material 830 will typically be made to a desired thickness, it could simply be positioned around the mandrel 334. In this manner, the first insulating material 830 defines a first wall thickness 832 of the pipe insulation 800.

The second insulating material 840 is the preformed, non-woven fiberglass mat 330, wherein multiple layers 332 of the mat 330 are spiral wound onto the first insulating material 830 to form the pipe insulation 800. The second insulating material 840 defines a second wall thickness 842 of the pipe insulation.

The sum of the first wall thickness 832 and the second wall thickness 842 equals the wall thickness 804. In some exemplary embodiments, the first wall thickness 832 is greater than the second wall thickness 842. In some exemplary embodiments, the first wall thickness 832 is less than the second wall thickness 842. In some exemplary embodiments, the first wall thickness 832 is equal to the second wall thickness 842.

In some exemplary embodiments, in addition to the first insulating material 830 and the second insulating material 840 having different properties, different layers 332 of the mat 330 could have different properties within the second insulating material 840.

Furthermore, such a hybrid pipe insulation product, like the pipe insulation 800, need not be formed solely by spiral winding. For example, in some exemplary embodiments, the second insulating material 840 could be spiral wound onto a mandrel having a diameter equal to the sum of the inner diameter 808 and the first wall thickness 832. Thereafter, once the second insulating material 840 is removed from the mandrel, the pre-made first insulating material 830 could be positioned inside the second insulating material 840 and joined thereto in any suitable manner (e.g., via thermal bonding, needling). Then, further processing of the joined insulating materials 830, 840 could take place, such as formation of the slit 812, application of the outer jacket 810, etc.

Thus, the pipe insulation 800 can be made to have two or more regions with differing properties. For example, the inner region formed of the first insulating material 830 can be much softer than the outer region formed of the second insulating material 840. This allows the pipe insulation 800 to fit over/around structures (e.g., couplings, fittings, valves) that extend beyond the circumference of the pipe on which the pipe insulation 800 is being installed. Thus, an installer avoids having to manually remove (e.g., cut out in a process normally referred to as filleting) an inner portion of the pipe insulation 800 to account for the aforementioned structures. This makes for quicker, easier, and safer installation of the pipe insulation 800.

Figure 9:
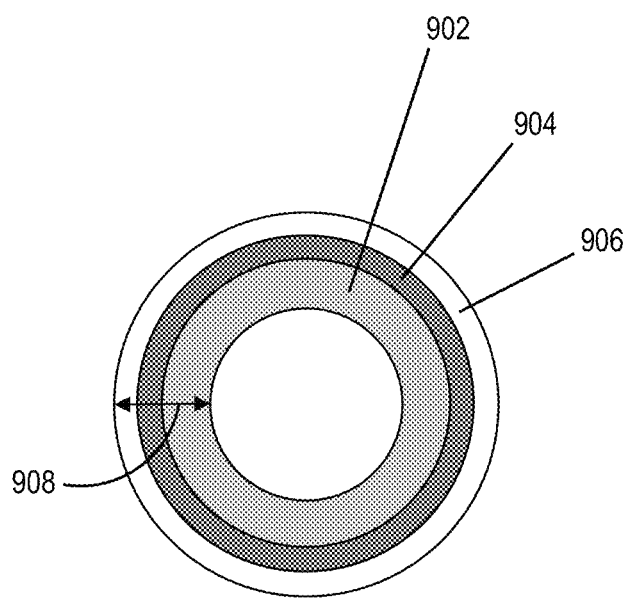
FIG. 9 is a front elevational view of the inventive pipe insulation, according to still another exemplary embodiment, with said view being aligned with a lengthwise axis of the pipe insulation.

To further illustrate the general inventive concepts, pipe insulation 900, according to another exemplary embodiment, is shown in FIG. 9. For simplification, only the arrangement of the insulating material is shown in FIG. 9, with any corresponding structure (e.g., slit, partial slit, outer jacket, etc.) omitted.

The pipe insulation 900 is comprised of a first region of insulating material 902, a second region of insulating material 904, and a third region of insulating material 906. At least one of the regions of insulating material 902, 904, 906 comprises multiple layers 332 of the preformed, non-woven fiberglass mat 330. The pipe insulation 900 has a wall thickness 908. For example, the wall thickness 908 could be 4 inches. The first region of insulating material 902 is ½ of the total wall thickness 908, or 2 inches. The second region of insulating material 904 is ¼ of the total wall thickness 908, or 1 inch. The third region of insulating material 906 is ¼ of the total wall thickness 908, or 1 inch.

Each of the regions of insulating material is made (or subsequently altered) to have a specific color reflective of its depth in the wall thickness 908. Thus, the first region of insulating material 902 is altered to have a first color, the second region of insulating material 904 is altered to have a second color, and the third region of insulating material 906 is altered to have a third color. In some exemplary embodiments, at least one of the regions 902, 904, 906 can remain in an unaltered/uncolored state. In some exemplary embodiments, only the innermost region (i.e., the first region of insulating material 902) is colored, that is has variations in color through the thickness of the insulating material 902.

The colors are used to signal a change in depth to an installer of the pipe insulation 900 when an inner portion of the pipe insulation 900 has to be manually removed (e.g., cut out in a process normally referred to as filleting) so that the pipe insulation 900 can fit over/around structures (e.g., couplings, fittings, valves) that extend beyond the circumference of the pipe on which the pipe insulation 900 is being installed. The added colors serve as a visual indicator to the installer to assist in gauging a depth of filleting. This can help avoid removal of an excess amount of the pipe insulation 900, and the corresponding reduction in R-value of the pipe insulation 900.

The pipe insulation 900 can have other features which assist in the manual removal of portions of the insulation. For example, in some exemplary embodiments, an adhesive or other material/means used to adhere adjacent regions together can be selected to facilitate manual separation of the two regions from one another. In this manner, removal of a portion of the insulation during a filleting process is facilitated, which can contribute to a quicker, easier, more accurate, and safer installation of the pipe insulation 900.

Figure 10:
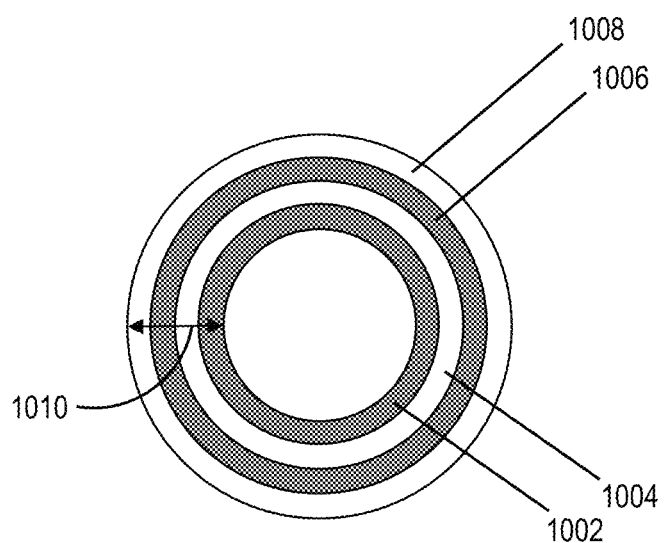
FIG. 10 is a front elevational view of the inventive pipe insulation, according to yet another exemplary embodiment, with said view being aligned with a lengthwise axis of the pipe insulation.

To further illustrate the general inventive concepts, pipe insulation 1000, according to yet another exemplary embodiment, is shown in FIG. 10. For simplification, only the arrangement of the insulating material is shown in FIG. 10, with any corresponding structure (e.g., slit, partial slit, outer jacket, etc.) omitted.

The pipe insulation 1000 is comprised of a first region of insulating material 1002, a second region of insulating material 1004, a third region of insulating material 1006, and a fourth region of insulating material 1008. In some exemplary embodiments, at least one of the regions of insulating material 1002, 1004, 1006, 1008 comprises multiple layers 332 of the preformed, non-woven fiberglass mat 330. The pipe insulation 1000 has a wall thickness 1010. For example, the wall thickness 1010 could be 4 inches. The first region of insulating material 1002 is ¼ of the total wall thickness 1010, or 1 inch. The second region of insulating material 1004 is ¼ of the total wall thickness 1010, or 1 inch. The third region of insulating material 1006 is ¼ of the total wall thickness 1010, or 1 inch. The fourth region of insulating material 1008 is ¼ of the total wall thickness 1010, or 1 inch.

In the pipe insulation 1000, the first region of insulating material 1002 and the third region of insulating material 1006 have one or more properties in common with one another. In the pipe insulation 1000, the second region of insulating material 1004 and the fourth region of insulating material 1008 have one or more properties in common with one another. In this manner, the pipe insulation 1000 can have alternating regions that provide similar properties, separated by regions that provide different properties.

By way of example, in the pipe insulation 1000, the first region of insulating material 1002 and the third region of insulating material 1006 can have substantially the same R-value (i.e., a first R-value). Likewise, in the pipe insulation 1000, the second region of insulating material 1004 and the fourth region of insulating material 1008 can have substantially the same R-value (i.e., a second R-value). However, in the pipe insulation 1000, the first R-value and the second R-value are significantly different.

In addition to the exemplary embodiments and techniques described above, the general inventive concepts encompass other methods of and systems for forming pipe insulation, wherein the properties of the pipe insulation can be adjusted or otherwise varied through the thickness of the pipe insulation.

For example, serial layering of different insulating materials can be used to form pipe insulation having different properties through its thickness. In some exemplary embodiments, the insulating materials are preformed mats, batts, sheets, etc. In some exemplary embodiments, at least one of the insulating materials could be constructed from multiple layers 332 of the fiberglass mat 330 (such as described herein).

Figure 11A:
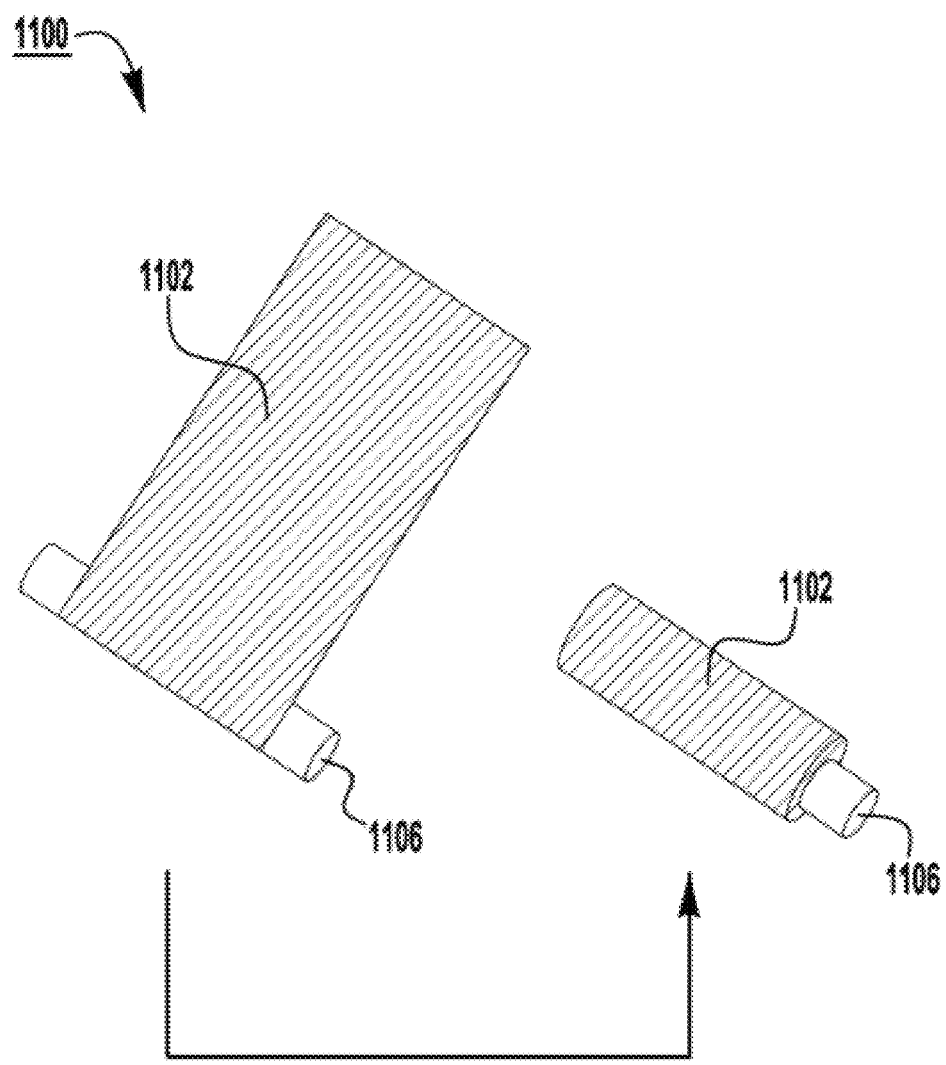
FIGS. 11A-11C illustrate a serial layering process for forming pipe insulation from different insulating materials, according to an exemplary embodiment.
Figure 11B:
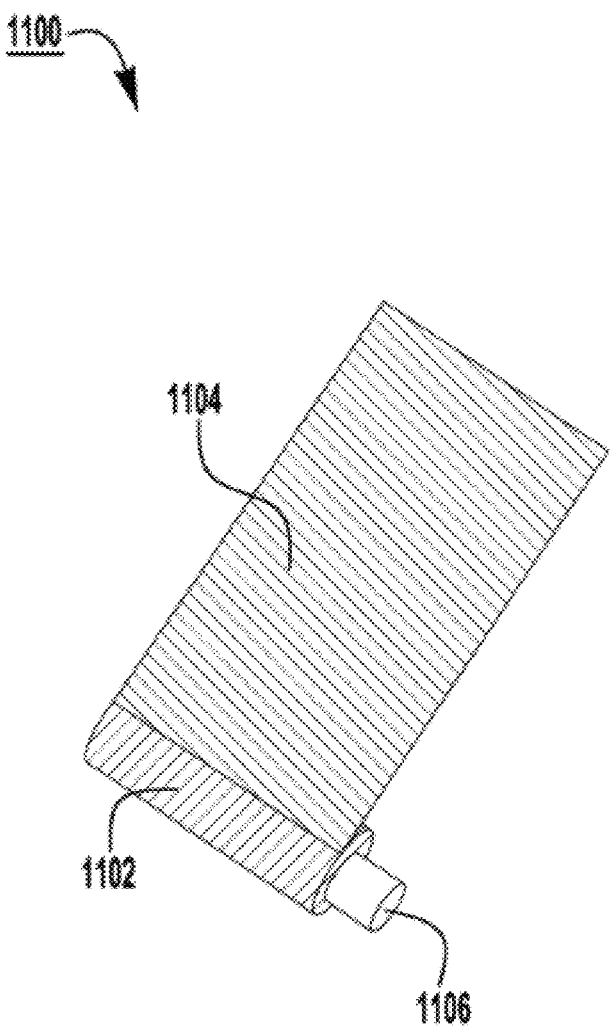
Figure 11C:
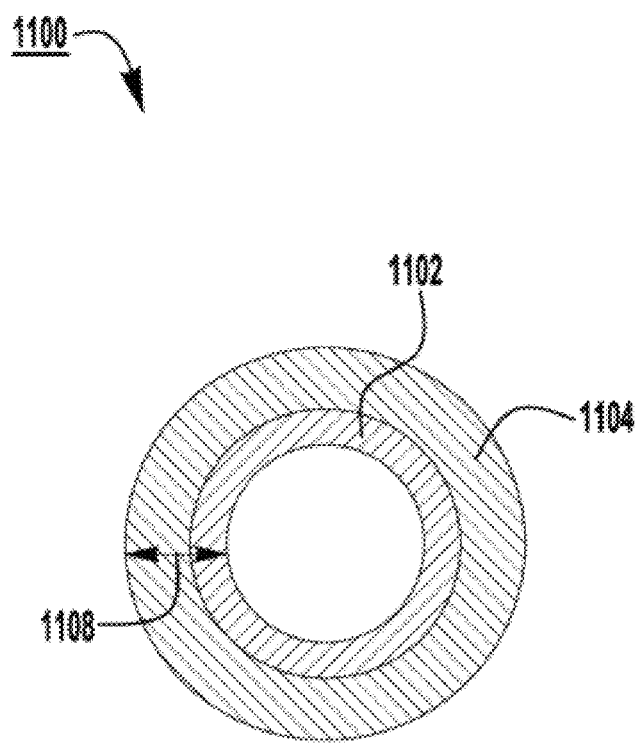

As shown in FIGS. 11A-11C, pipe insulation 1100 is formed by serial layering a first insulating material 1102 and a second insulating material 1104 around a mandrel 1106, tube, or the like. This serial layering could be performed as a continuous process.

The first insulating material 1102 is wound around the mandrel 1106 until a desired thickness $t_1$ of the first insulating material 1102 is achieved (see FIG. 11A). Then, the second insulating material 1104 is wound around the first insulating material 1102 on the mandrel 1106 until a desired thickness $t_2$ of the second insulating material 1104 is achieved (see FIG. 11B).

Thereafter, the first insulating material 1102 and the second insulating material 1104 are connected to one another to form the pipe insulation 1100. Any suitable means of connecting the first insulating material 1102 and the second insulating material 1104 can be used, such as a binder, adhesive, stitching, mechanical entanglement, etc. Mechanical entanglement can involve needling fibers in the first insulating material 1102 and fibers in the second insulating material 1104. Such mechanical entanglement can be particularly beneficial when many discrete layers need to be connected and use of a binder or adhesive would have drawbacks (e.g., increased costs, increased flammability due to additional organic material).

In this manner, the pipe insulation 1100 has a thickness 1108 ($t_1+t_2$) through which at least one property differs (see FIG. 11C). For example, a density of the first insulating material 1102 can differ from a density of the second insulating material 1104, such that the pipe insulation 1100 has a region (corresponding to the thickness $t_1$) with a compressibility that differs from the compressibility of another region (corresponding to the thickness $t_2$) through its thickness 1108.

As another example, parallel layering of different insulating materials can be used to form pipe insulation having different properties through its thickness. In other words, winding of a multi-layered insulating material, wherein the properties between two or more layers differ from one another, can be used to form pipe insulation having different properties through its thickness. In some exemplary embodiments, at least one layer of the multi-layered insulating material is a preformed mat, batt, sheet, etc. In some exemplary embodiments, at least one layer of the multi-layered insulating material could be constructed from multiple layers 332 of the fiberglass mat 330 (such as described herein).

Figure 12A:
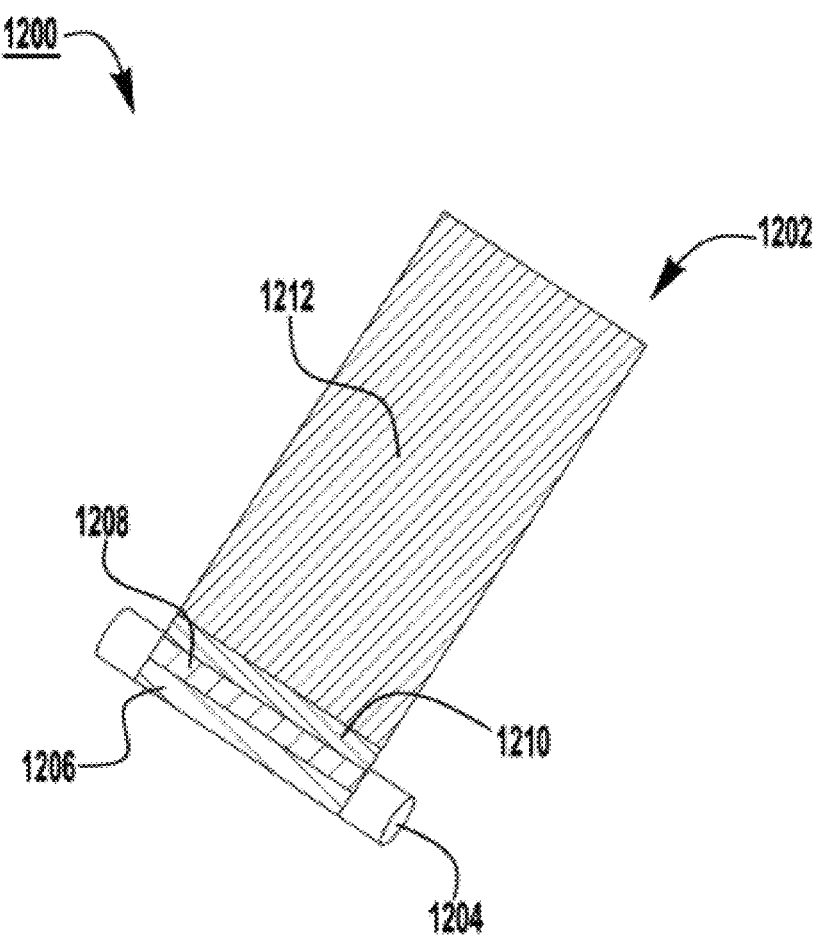
FIGS. 12A-12B illustrate a parallel layering process for forming pipe insulation from different insulating materials, according to an exemplary embodiment.
Figure 12B:
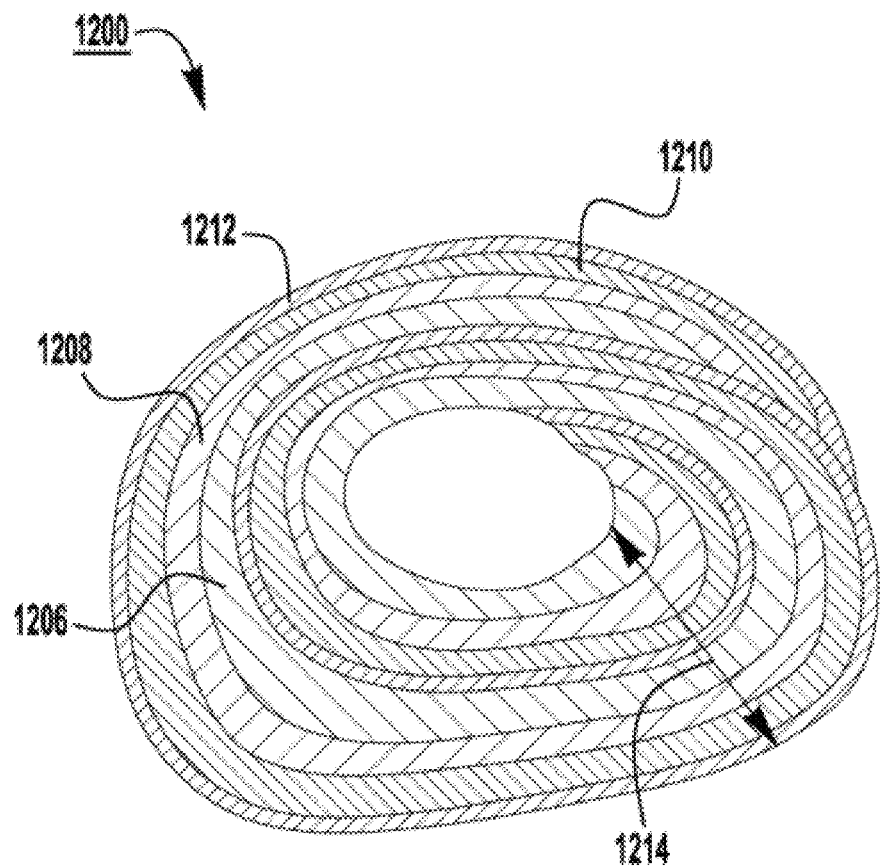

As shown in FIGS. 12A-12B, pipe insulation 1200 is formed by winding a multi-layered insulating material 1202 around a mandrel 1204, tube, or the like. This parallel layering could be performed as a continuous process.

In this case, the multi-layered insulating material 1202 includes four layers of different insulating materials: 1206, 1208, 1210, and 1212, which are shown offset from one another in FIG. 12A for ease of illustration. The layers 1206, 1208, 1210, and 1212 can be joined together by any suitable means, such as a binder, adhesive, stitching, mechanical entanglement, etc. The multi-layer insulating material 1202 is wound around the mandrel 1204 until a desired thickness 1214 for the pipe insulation 1200 is achieved (see FIG. 12B). In this manner, the pipe insulation 1200 has one or more alternating sets of layers of insulating material with different properties through its thickness 1214. As shown in FIG. 12B, the layers form a spiral configuration (looking somewhat like a pumpkin roll).

Figure 13:
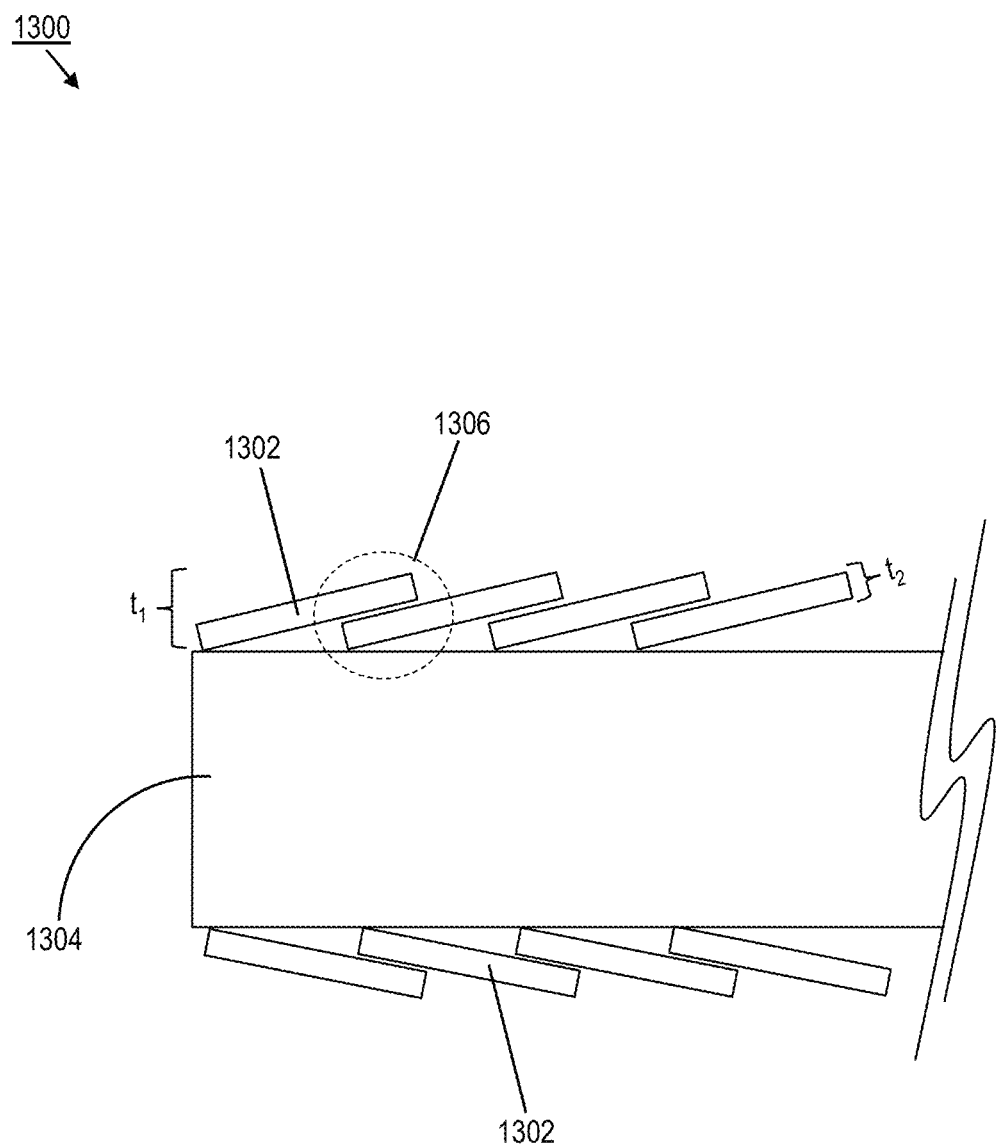
FIG. 13 illustrates an overlapped winding process for forming pipe insulation, according to an exemplary embodiment.

With respect to the winding operations described herein, the inventive concepts contemplate that in some exemplary embodiments, an insulating material can be wound around a mandrel in such a manner that a portion of the insulating material overlaps itself, referred to herein as overlapped winding. As shown in FIG. 13, a pipe insulation 1300 is formed by winding a single ribbon of insulation material 1302 around a mandrel 1304 in such a manner that a widthwise portion 1306 of the insulation material 1302 overlaps itself. As a result, a wall thickness $t_1$ of the pipe insulation 1300 can be greater (e.g., approximately twice as thick) as a thickness $t_2$ of the insulation material 1302. In general, the overlapping portion 1306 is at least 25% of the width of the insulation material 1302.

EXAMPLES

In a first example, a 100% glass fiber, spiral wound pipe insulation is formed. In this case, four (4) ⅛-inch thick layers of bound fiberglass material were cut into 3-inch wide ribbons and spiral wound around a 2-inch mandrel. Polyolefin hot melt was utilized to adhere the multiple layers to one another, resulting in a pipe insulation having a thickness of ½ inches.

In a second example, a 100% polymer fiber, spiral wound pipe insulation is formed. In this case, four (4) ⅛-inch thick layers of polymer non-woven (PET-based) material were cut into 3-inch wide ribbons and spiral wound around a 1.3-inch mandrel. Polyolefin hot melt was utilized to adhere the multiple layers to one another, resulting in a pipe insulation having a thickness of ½ inches.

In a third example, a varying composition, spiral wound pipe insulation is formed. In this case, two (2) ⅛-inch thick layers of polymer non-woven (PET-based) material and two (2) ⅛-inch thick layers of bound fiberglass material were cut into 3-inch wide ribbons and spiral wound around a 2-inch mandrel. Polyolefin hot melt was utilized to adhere the multiple layers to one another, resulting in a pipe insulation having a thickness of ½ inches.

In a fourth example, a varying color, spiral wound pipe insulation is formed. In this case, one (1) ⅛-inch thick layer of orange bound fiberglass material and two (2) ⅛-inch thick layers of white polymer non-woven (PET-based) material were cut into 3-inch wide ribbons and spiral wound around a 2-inch mandrel. Polyolefin hot melt was utilized to adhere the multiple layers to one another, resulting in a pipe insulation having a thickness of ⅜ inches.

In a fifth example, a varying density, spiral wound pipe insulation is formed. In this case, two (2) ⅛-inch thick layers of 3 pcf bound fiberglass material and two (2) ⅛-inch thick layers of 7 pcf bound fiberglass material were cut into 3-inch wide ribbons and spiral wound around a 2-inch mandrel. Spray adhesive was utilized to adhere the multiple layers to one another, resulting in a pipe insulation having a thickness of ½ inches.

In a sixth example, an overlapped, spiral wound pipe insulation is formed. In this case, four (4) ⅛-inch thick layers of polymer non-woven (PET-based) material were cut into 3-inch wide ribbons and spiral wound around a 0.8-inch mandrel such that each ribbon overlapped itself by 30% to form a layer. Polyolefin hot melt was utilized to adhere the multiple layers to one another, resulting in a pipe insulation having a thickness varying from ½ inches to ⅝ inches.

One of ordinary skill in the art will appreciate that more or fewer layers of different insulating materials could be used without departing from the spirit and scope of the general inventive concepts. In general, at least two layers having at least one property that differs between the layers would be used in the multi-layering approach. Furthermore, as described elsewhere herein, any number of properties can differ between the layers 1206, 1208, 1210, 1212. For example, and not by way of limitation, such properties could include one or more of a material (e.g., glass) type used to form the insulating materials, a sizing applied to the glass used to form the insulating materials, a binder used to form the insulating materials, a fiber diameter used to form the insulating materials, a fiber form (e.g., chopped, continuous) used to form the insulating materials, an orientation of the fibers within the insulating materials, a thickness of the insulating materials, a density of the insulating materials, an R-value of the insulating materials, etc. Additionally, such properties might not be directly related to the performance of the insulating materials, for example, a color of the insulating materials.

The scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof.

The invention claimed is:

1. A pipe insulation comprising:
    an elongated hollow cylinder of insulation material with a thickness t, the thickness extending from an inner surface of the cylinder to an outer surface of the cylinder,
    wherein a plurality of regions are defined through the thickness t, each of the regions being concentric relative to a central axis of the elongated hollow cylinder,
    wherein a property of the pipe insulation in a first region of the cylinder differs from the property of the pipe insulation in a second region of the cylinder,
    wherein at least one of the first region and the second region comprises a plurality of adjacent layers of the insulation material, each of the adjacent layers having the same property and each of the adjacent layers being a nonwoven fiberglass mat having a thickness less than 0.5 inches and an area weight less than 0.08 lb/ft$^2$, and
    wherein a lengthwise slit extends through the thickness of the pipe insulation.

2. The pipe insulation of claim 1, wherein the first region of the cylinder is adjacent to the second region of the cylinder.

3. The pipe insulation of claim 1, wherein the property of the pipe insulation that differs between the first region and the second region is its color.

4. The pipe insulation of claim 1, wherein the property of the pipe insulation that differs between the first region and the second region is its R-value.

5. The pipe insulation of claim 1, wherein the property of the pipe insulation that differs between the first region and the second region is its density.

6. The pipe insulation of claim 1, wherein the property of the pipe insulation that differs between the first region and the second region is at least one of its porosity, modulus, tensile strength, temperature resistance, and moisture resistance.

7. The pipe insulation of claim 1, wherein the insulation material comprises a plurality of fibers held together by a cured binder, and
    wherein the property of the pipe insulation that differs between the first region and the second region is at least one of its binder composition and binder content.

8. The pipe insulation of claim 1, wherein the pipe insulation comprises 2 to 24 adjacent layers of the insulation material.

9. The pipe insulation of claim 1, wherein the insulation material comprises a plurality of fibers, and
    wherein the property of the pipe insulation that differs between the first region and the second region is at least one of its fiber type and fiber diameter.

10. The pipe insulation of claim 9, wherein the first region includes glass fibers and the second region includes mineral wool fibers.

11. The pipe insulation of claim 1, wherein the first region has a thickness $t_1$,
    wherein the second region has a thickness $t_2$,
    wherein $t_1 < t$, and
    wherein $t_2 < t$.

12. The pipe insulation of claim 11, wherein $t_1 + t_2 < t$.

13. The pipe insulation of claim 11, $t_1 = t_2$.

14. The pipe insulation of claim 11, $t_1 < t_2$.

15. The pipe insulation of claim 1, wherein a third region of the cylinder abuts the second region of the cylinder but not the first region of the cylinder, and
    wherein a property in the third region of the cylinder differs from the property in at least one of the first region of the cylinder and the second region of the cylinder.

16. The pipe insulation of claim 15, wherein the property in the third region of the cylinder differs from the property in both the first region of the cylinder and the second region of the cylinder.

17. The pipe insulation of claim 15, wherein the first region has a thickness $t_1$,
    wherein the second region has a thickness $t_2$,
    wherein the third region has a thickness $t_3$,
    wherein $t_1 < t$,
    wherein $t_2 < t$,
    wherein $t_3 < t$, and
    wherein $t_3 = t_1$.

18. The pipe insulation of claim 15, wherein the first region has a thickness $t_1$,
    wherein the second region has a thickness $t_2$,
    wherein the third region has a thickness $t_3$,
    wherein $t_1 < t$,
    wherein $t_2 < t$,
    wherein $t_3 < t$, and
    wherein $t_3 = t_2$.

19. The pipe insulation of claim 15, wherein the first region has a thickness $t_1$,
    wherein the second region has a thickness $t_2$,
    wherein the third region has a thickness $t_3$,
    wherein $t_1 < t$,
    wherein $t_2 < t$,
    wherein $t_3 < t$, and
    wherein $t_3 < t_1$.

20. The pipe insulation of claim 15, wherein the first region has a thickness $t_1$,
    wherein the second region has a thickness $t_2$,
    wherein the third region has a thickness $t_3$,
    wherein $t_1 < t$,
    wherein $t_2 < t$,
    wherein $t_3 < t$, and
    wherein $t_3 < t_2$.

21. The pipe insulation of claim 15, wherein the first region has a thickness $t_1$,
    wherein the second region has a thickness $t_2$,
    wherein the third region has a thickness $t_3$,
    wherein $t_1 < t$,
    wherein $t_2 < t$,
    wherein $t_3 < t$, and
    wherein $t_3 > t_1$.

22. The pipe insulation of claim 15, wherein the first region has a thickness $t_1$, wherein the second region has a thickness $t_2$,
wherein the third region has a thickness $t_3$,
wherein $t_1<t$,
wherein $t_2<t$,
wherein $t_3<t$, and
wherein $t_3>t_2$.

\* \* \* \* \*